US 11,694,381 B2
United States Patent
Dirksen et al.

(10) Patent No.: US 11,694,381 B2
(45) Date of Patent: Jul. 4, 2023

(54) SYSTEMS AND METHODS FOR REAL-TIME COMPLEX CHARACTER ANIMATIONS AND INTERACTIVITY

(71) Applicant: Baobab Studios Inc., Redwood City, CA (US)

(72) Inventors: Nathaniel Christopher Dirksen, Redwood City, CA (US); Michael Scott Hutchinson, San Carlos, CA (US); Eric Richard Darnell, Campbell, CA (US); Lawrence David Cutler, San Francisco, CA (US); Daniel Tomas Steamer, Menlo Park, CA (US); Apostolos Lerios, Austin, TX (US)

(73) Assignee: Baobab Studios Inc., Redwood City, CA (US)

(*) Notice: Subject to any disclaimer, the term of this patent is extended or adjusted under 35 U.S.C. 154(b) by 0 days.

(21) Appl. No.: 17/200,604

(22) Filed: Mar. 12, 2021

(65) Prior Publication Data
US 2021/0201552 A1    Jul. 1, 2021

Related U.S. Application Data

(63) Continuation of application No. 17/153,779, filed on Jan. 20, 2021, which is a continuation of application
(Continued)

(51) Int. Cl.
*G06T 15/00* (2011.01)
*G06T 13/40* (2011.01)
(Continued)

(52) U.S. Cl.
CPC ............. *G06T 13/40* (2013.01); *G06F 17/16* (2013.01); *G06K 9/6223* (2013.01);
(Continued)

(58) Field of Classification Search
CPC ... G06T 17/05; G06T 17/205; G06T 2210/12; G06T 19/006; G06T 19/20; G06T 13/20;
(Continued)

(56) References Cited

U.S. PATENT DOCUMENTS 6,940,505 B1    9/2005  Savine
7,138,999 B2   11/2006  Alliez
(Continued)

FOREIGN PATENT DOCUMENTS

KR    10-2013-0115237    10/2013
WO         9964944 A2    12/1999
(Continued)

OTHER PUBLICATIONS

Wang, Quantization, Polytechnic University, Multimedia Communication Systems, 2006, pp. 1-33.*
(Continued)

*Primary Examiner* — Phu K Nguyen
(74) *Attorney, Agent, or Firm* — Sheppard Mullin Richter & Hampton LLP

(57) ABSTRACT

Systems, methods, and non-transitory computer-readable media can identify a virtual character being presented to a user within a real-time immersive environment. A first animation to be applied to the virtual character is determined. A nonverbal communication animation to be applied to the virtual character simultaneously with the first animation is determined. The virtual character is animated in real-time based on the first animation and the nonverbal communication animation.

20 Claims, 16 Drawing Sheets

Related U.S. Application Data

No. 16/045,563, filed on Jul. 25, 2018, now Pat. No. 10,937,219.

(60) Provisional application No. 62/538,590, filed on Jul. 28, 2017.

(51) Int. Cl.
| | |
|---|---|
| *G06F 17/16* | (2006.01) |
| *G06T 17/20* | (2006.01) |
| *H04N 19/463* | (2014.01) |
| *G06T 19/20* | (2011.01) |
| *G06T 13/20* | (2011.01) |
| *G06T 17/05* | (2011.01) |
| *G06T 19/00* | (2011.01) |
| *G06T 15/04* | (2011.01) |
| *H04L 65/4053* | (2022.01) |
| *H04N 19/124* | (2014.01) |
| *H04N 19/46* | (2014.01) |
| *G06K 9/62* | (2022.01) |
| *G06T 9/00* | (2006.01) |
| *G10L 19/038* | (2013.01) |
| *G10L 19/00* | (2013.01) |

(52) U.S. Cl.
CPC ............ *G06K 9/6247* (2013.01); *G06T 9/001* (2013.01); *G06T 13/20* (2013.01); *G06T 15/04* (2013.01); *G06T 17/05* (2013.01); *G06T 17/20* (2013.01); *G06T 19/003* (2013.01); *G06T 19/006* (2013.01); *G06T 19/20* (2013.01); *G10L 19/038* (2013.01); *H04L 65/4053* (2013.01); *H04N 19/124* (2014.11); *H04N 19/46* (2014.11); *H04N 19/463* (2014.11); *G06T 2210/12* (2013.01); *G06T 2219/2021* (2013.01); *G10L 19/00* (2013.01)

(58) Field of Classification Search
CPC ......... G06T 15/04; G06T 9/001; G06T 13/40; G06T 2219/2021; G06T 19/003; G06T 17/20; H04N 19/46; H04N 19/124; H04N 19/463; G06K 9/6223; G06K 9/6247; G10L 19/038; G10L 19/00; H04L 65/4053; G06F 17/16; G06V 10/763
USPC ......................................................... 345/418
See application file for complete search history.

(56) References Cited

U.S. PATENT DOCUMENTS

| | | | |
|---|---|---|---|
| 8,355,020 | B1 | 1/2013 | Hanau et al. |
| 8,749,556 | B2 | 6/2014 | de Aguiar et al. |
| 8,754,831 | B2 | 6/2014 | Kolin et al. |
| 9,002,121 | B2 | 4/2015 | Cai et al. |
| 9,223,138 | B2 | 12/2015 | Bohn |
| 9,353,965 | B1 | 5/2016 | Goyal et al. |
| 9,639,981 | B1* | 5/2017 | Holliday ................. G06T 17/10 |
| 9,727,296 | B2 | 8/2017 | Wan et al. |
| 10,303,341 | B2 | 5/2019 | Mosqueda Mejia et al. |
| 10,431,000 | B2 | 10/2019 | Zhang |
| 11,158,121 | B1* | 10/2021 | Tung ........................ G06T 17/20 |
| 2003/0184547 | A1 | 10/2003 | Haratsch et al. |
| 2006/0139347 | A1 | 6/2006 | Choi |
| 2006/0139348 | A1 | 6/2006 | Harada |
| 2007/0247458 | A1 | 10/2007 | Surazhsky |
| 2009/0213138 | A1 | 8/2009 | DeRose et al. |
| 2010/0033488 | A1 | 2/2010 | Zhou et al. |
| 2010/0149179 | A1 | 6/2010 | de Aguiar et al. |
| 2012/0019517 | A1 | 1/2012 | Corazza et al. |
| 2013/0141431 | A1 | 6/2013 | Kawakami et al. |
| 2013/0182960 | A1 | 7/2013 | Cai |
| 2014/0226722 | A1 | 8/2014 | Izvorski |
| 2015/0138209 | A1 | 5/2015 | Dorie |
| 2015/0350641 | A1* | 12/2015 | Zhou ....................... H04N 19/98 375/240.02 |
| 2016/0162603 | A1 | 6/2016 | Schriesheim et al. |
| 2016/0171738 | A1 | 6/2016 | Freeman |
| 2017/0039750 | A1* | 2/2017 | Tong ....................... G06T 13/40 |
| 2017/0080331 | A1 | 3/2017 | Paquet |
| 2017/0098325 | A1 | 4/2017 | Wampler |
| 2017/0148214 | A1 | 5/2017 | Muniz-Simas |
| 2018/0012407 | A1* | 1/2018 | Chuang ................... G06T 15/04 |
| 2018/0122148 | A1 | 5/2018 | Janzer et al. |
| 2018/0182152 | A1 | 6/2018 | Pan et al. |
| 2019/0073826 | A1* | 3/2019 | Bailey ........................ G06T 7/75 |
| 2021/0142546 | A1* | 5/2021 | Dirksen ............... G06K 9/6223 |
| 2021/0201552 | A1* | 7/2021 | Dirksen ............... G06V 10/763 |
| 2021/0349529 | A1* | 11/2021 | Winold ................ A61B 5/1124 |
| 2021/0350621 | A1* | 11/2021 | Bailey ................... G06T 3/4046 |
| 2022/0068007 | A1* | 3/2022 | Lafer ....................... G06T 17/00 |

FOREIGN PATENT DOCUMENTS

| | | |
|---|---|---|
| WO | 2014022448 | 2/2014 |
| WO | 2016144279 | 9/2016 |
| WO | 2016205182 | 12/2016 |
| WO | 2017007179 | 1/2017 |
| WO | 2018081732 | 5/2018 |

OTHER PUBLICATIONS

Thanou D, Chou PA, Frossard P. Graph-Based Compression of Dynamic 3D Point Cloud Sequences. IEEE Transactions on Image Processing: a Publication of the IEEE Signal Processing Society. Feb. 11, 2016;25(4):1765-78.*

Kat, "How to Transfer an Animation Between Characters in Maya", Online at <URL: https://www.youtube.com/watch?v=QEQuLE75MjY>, May 25, 2016, 1 page.

Rosana Marar, "Copying Animation in Maya Tutorial", Online at <URL: https://www.youtube.com/watch?v=x4v6Jh-Rpjw>, Aug. 14, 2014, 1 page.

European Patent Application No. 18838343.4, Supplementary European Search Report dated Mar. 26, 2021, 9 pages.

European Patent Application No. 18838447.3, Supplementary Partial European Search Report dated Mar. 3, 2021, 12 pages.

European Patent Application No. 18838846.6, Supplementary European Search Report dated Apr. 8, 2021, 11 pages.

International Application No. PCT/US2018/043759, International Search Report and Written Opinion dated Nov. 2, 2018.

International Application No. PCT/US2018/043781, International Search Report and Written Opinion dated Nov. 7, 2018.

International Application No. PCT/US2018/043782, International Search Report and Written Opinion dated Nov. 13, 2018.

International Application No. PCT/US2018/043785, International Search Report and Written Opinion dated Nov. 9, 2018.

Capell, Steve, et al., "Physically Based Rigging for Deformable Characters", Graphical Models, vol. 69, No. 1, Elsevier, Nov. 10, 2006 (Nov. 10, 2006), XP005724016, pp. 71-87.

Driscoll, Michael, et al., "Approximate Subdivision Surface Evaluation in the Language of Linear Algebra", XP055777261, Retrieved from the Internet: <URL: https://people.eecs.berkeley.edu/~sequin/CS284/PROJ_12/Michael/report.pdf>, [retrieved on Feb. 17, 2021], 2012, pp. 1-10.

Guo, Zheng, et al., "NeuroEnveloping: A Transferable Character Skin Deformation Technique", IEEE Proceedings of the 12th Pacific Conference on Computer Graphics and Applications (PG'04), Seoul, Korea, IEEE, XP010735028, Oct. 6, 2004 (Oct. 6, 2004), pp. 77-86.

Heinzmann, Jochen, et al., "3-D Facial Pose and Gaze Point Estimation Using a Robust Real-Time Tracking Paradigm", Automatic Face and Gesture Recognition, 1998 Proceedings of the Third IEEE International Conference on Nara, Japan, XP010277652, Apr. 14, 1998 (Apr. 14, 1998), pp. 142-147.

Hulsmann, Felix, et al., "Comparing Gaze-Based and Manual Interaction in a Fast-Paced Gaming Task in Virtual Reality", In Proceedings of the Workshop Virtuelle and Erweiterte Realitat, 2011, 12 pages.

(56) References Cited

OTHER PUBLICATIONS

Jeremy P., Working with Mo-Cap Data in Maya, Jan. 25, 2016; https://www.youtube.com/watch?v=Wj09J0I42SU, 1 page.
Maglo, Adrien et al., "3D Mesh Compression: Survey, Comparisons and Emerging Trends," ACM Computing Surveys, vol. 9, No. 4, Article 39, pp. 39:1-39:40, Sep. 2013.
Madaras, Martin et al., "Skeleton-Based Matching for Animation Transfer and Joint Detection", Computer Graphics, ACM, XP058056096, May 28, 2014 (May 28, 2014), pp. 91-98.
Manson, Josiah et al., "Hierarchical Deformation of Locally Rigid Meshes," Computer Graphics Forum, vol. 30, No. 8, pp. 2387-2396, Oct. 31, 2011.
Miranda, Jose Carlos, "Intuitive Real Time Facial Interaction and Animation", A Dissertation in Computer Graphics Human Computer Interaction, 2013, University of Porto (Year: 2013), 139 pages.
Nießner, Matthias, et al., "Feature-Adaptive GPU Rendering of Catmull-Clark Subdivision Surfaces", ACM Transactions on Graphics, vol. 31, No. 1, Article 6, XP055777255, Jan. 2012, Retrieved from the Internet: <URL:https://dl.acm.org/doi/pdf/10.1145/2077341.2077347>, pp. 1-11.
Pfeiffer, Thies, "Towards Gaze Interaction in Immersive Virtual Reality: Evaluation of a Monocular Eye Tracking Set-Up", In Virtuelle und Erweiterte Realitat-Funfter Workshop der GI=Fachgruppe, VR/AR, 2008, 12 pages.
"RIOS-SORIA, David J., et al., ""Hand-Gesture Recognition Using Computer-Vision Techniques""", 21st International Conference on Computer Graphics, Visualization and Computer Vision, XP055786703, Retrieved from the Internet: <URL: https://core.ac.uk/download/pdf/295558123.pdf>, Jan. 1, 2013 (Jan. 1, 2013), 8 pages."
State, Andrei, "Exact Eye Contact with Virtual Humans", Human-Computer Interaction: IEEE International Workshop, HCI 2007, Rio de Janeiro, Brazil, Oct. 20, 2007, Proceedings 4 2007, Springer Berlin Heidelberg, pp. 138-145.
Steptoe, William, et al., "Eye-Tracking for Avatar Eye-Gaze and Interactional Analysis in Immersive Collaborative Virtual Environments", Computer Supported Cooperative Work (CSCW'08), ACM, XP058175847, Nov. 8, 2008 (Nov. 8, 2008), pp. 197-200.
Tan, Jie, et al., "Learning Bicycle Stunts", ACM Transactions on Graphics (TOG), vol. 33, No. 4, 2014, pp. 1-12.
Thiebaux, Marcus, et al., "Real-Time Expressive Gaze Animation for Virtual Humans", in Proceedings of The 8th International Conference on Autonomous Agents and Multiagent Systems, vol. 1, May 10, 2009, International Foundation for Autonomous Agents and Multiagent Systems, pp. 321-328.
Yuan, M.L., et al., "Eye Contact with a Virtual Character Using a Vision-Based Head Tracker", Computer and Information Sciences, Lecture Notes, Springer, Dordrecht, 2011, pp. 217-225.
Zorin, Denis, et al., "Interpolating Subdivision for Meshes with Arbitrary Topology", Computer Graphics Proceedings (SIGGRAPH '96), ACM, New York, XP058220095, Aug. 1996 (Aug. 1996), pp. 189-192.
European Patent Application No. 18837577.8, Supplementary Partial European Search Report dated Oct. 13, 2021, 10 pages.
Smith, Raymond Jam Es, "Animation of Captured Surface Data", PhD Thesis, Sep. 30, 2003 (Sep. 30, 2003), XP055846489, [retrieved on Sep. 30, 2021], 168 pages.
European Patent Application No. 18837577.8, Supplementary European Search Report dated Jul. 5, 2022, 14 pages.
Chover, M., et al., "Skeleton Subspace Deformation with Displacement Map", Eurographics 2003, retrieved from the Internet: <URL: http://web.cecs.pdx.edu/~fliu/papers/eg2003.pdf>, retrieved on Jun. 27, 2022, XP055935716, Jan. 1, 2003 (Jan. 1, 2003), 6 pages.
Lengyel, Jerome Edward, "Compression of Time-Dependent Geometry", Proceedings of the 1999 Symposium on Interactive 3D Graphics, Apr. 26, 1999 (Apr. 26, 1999), XP001033619, pp. 89-95.
Mamou, Khaled, et al., "A Skinning Approach for Dynamic 3D Mesh Compressoin", Computer Animation and Virtual Worlds, vol. 17, Nos. 3-4, Jul. 1, 2006 (Jul. 1, 2006), XP055313896, pp. 337-346.
Hoppe, Hugues, "View-Dependent Refinement of Progressive Meshes", Proceedings of the 24th Annual Conference on Computer Graphics and Interactive Techniques, Aug. 3, 1997, pp. 189-198).
Huang, Fu-Chung, et al., "Progressive Deforming Meshes Based on Deformation Oriented Decimation and Dynamic Connectivity Updating", Symposium on Computer Animation, Eurographics/ACM SIGGRAPH, Sep. 2, 2006, pp. 53-62.
Kao, Chi-Kang, et al., "Representing Progressive Dynamic 3D Meshes and Applications", IEEE 2010 18th Pacific Conference on Computer Graphics and Applications, Sep. 25, 2010, pp. 5-13.
Liu, Xin, et al., "Efficient Human Motion Retrieval via Temporal Adjacent Bag of Words and Discriminative Neighborhood Preserving Dictionary Learning", IEEE Transactions on Human-Machine Systems, vol. 47, No. 6, Dec. 2017, pp. 763-776.
Zdolbitska, N.V., et al., "Library Development for Character Real-Time Animation", Lutsk Naitonal Technical University, No. 18, 2015, pp. 172-177.
Zhang, ShiXue, et al., "An Improved Method for Progressive Animation Models Generation", Science China Information Sciences, vol. 53, No. 7, Jul. 2010, pp. 1312-1321.
Korean Patent Application No. 10-2020-7005334, Korean Notice of Preliminary Rejection dated Oct. 12, 2022, with English translation, 11 pages.
Chinese Patent Application No. 201880061321.9, First Office Action dated Mar. 1, 2023, 7 pages.

\* cited by examiner

800

900

1200

```
┌─────────────────────────────────────────────────────────────────────────────┐
│ Receive virtual model information associated with a virtual deformable geometric model, │
│ the virtual model information comprising a complex rig comprising a first plurality of │
│ transforms and a first plurality of vertices defined by a default model, and a simplified rig │
│ comprising a second plurality of transforms and a second plurality of vertices, wherein the │
│ second plurality of vertices correspond to the first plurality of vertices defined by the default │
│                                     model                                    │
│                                     1202                                     │
└─────────────────────────────────────────────────────────────────────────────┘
                                        │
                                        ▼
┌─────────────────────────────────────────────────────────────────────────────┐
│  Deform the simplified rig and the complex rig based on an animation to be applied to the │
│                        virtual deformable geometric model                    │
│                                     1204                                     │
└─────────────────────────────────────────────────────────────────────────────┘
                                        │
                                        ▼
┌─────────────────────────────────────────────────────────────────────────────┐
│ Calculate a set of offset data, the set of offset data comprising, for each vertex in the first │
│ plurality of vertices, an offset between the vertex and a corresponding vertex in the second │
│                              plurality of vertices                           │
│                                     1206                                     │
└─────────────────────────────────────────────────────────────────────────────┘
                                        │
                                        ▼
┌─────────────────────────────────────────────────────────────────────────────┐
│ Export a compressed version of the set of offset data to a real-time processing engine for │
│            real-time animation of the virtual deformable geometric model     │
│                                     1208                                     │
└─────────────────────────────────────────────────────────────────────────────┘
```

1302 Identify a virtual deformable geometric model to be animated in a real-time immersive environment, the virtual deformable geometric model comprising a virtual model mesh comprising a plurality of vertices, a plurality of edges, and a plurality of faces

1304 Iteratively refine the virtual model mesh in one or more iterations to generate a refined mesh, wherein each iteration of the one or more iterations increases the number of vertices, the number of edges, and/or the number of faces

1306 Present the refined mesh during real-time animation of the virtual deformable geometric model within the real-time immersive environment

FIGURE 13

SYSTEMS AND METHODS FOR REAL-TIME COMPLEX CHARACTER ANIMATIONS AND INTERACTIVITY

CROSS-REFERENCE TO RELATED APPLICATIONS

This application is a continuation of U.S. patent application Ser. No. 17/153,779, filed on Jan. 20, 2021 and entitled "SYSTEMS AND METHODS FOR REAL-TIME COMPLEX CHARACTER ANIMATIONS AND INTERACTIVITY", which claims priority to U.S. patent application Ser. No. 16/045,563, filed on Jul. 25, 2018, issued as U.S. Pat. No. 10,937,219 on Mar. 2, 2021, and entitled "SYSTEMS AND METHODS FOR REAL-TIME COMPLEX CHARACTER ANIMATIONS AND INTERACTIVITY," which claims priority to U.S. Provisional Patent Application No. 62/538,590, filed on Jul. 28, 2017 and entitled "SYSTEMS AND METHODS FOR COMPLEX CHARACTER ANIMATIONS AND INTERACTIVITY FOR VR AND AR," all of which are incorporated in their entireties herein by reference.

FIELD OF THE INVENTION

The present technology relates to the field of digital character animation. More particularly, the present technology relates to techniques for real-time complex character animations and interactivity.

BACKGROUND

Virtual Reality (VR) and Augmented Reality (AR) are new mediums for entertainment and storytelling that enable content creators to immerse the viewer in ways that are not possible in other mediums. VR and AR are powerful immersive platforms to tell engaging stories with characters that audiences can empathize with, much as one would experience in literature or cinema. Digital characters, such as those used in VR and AR experiences, often begin as a neutralized 3D model (often called the "default model"). A character "rig" is a digital puppet that enables character models to be animated so that they can move, locomote, and emote, all in a believable way, giving the illusion of life. The character rig takes static default character models as inputs and then applies a set of procedural modifications to these models based on animation input controls (such as how many degrees the elbow is bent or how much the mouth of a character is smiling), producing a deforming, expressive character that animates over time. The character rig typically comprises a set of animation controls which drive an underlying hierarchy or collection of skeletal joints or bones. This process is often referred to as the motion system of the character. Then deformation layer(s) attach or bind the character models to these animated skeletons using a variety of techniques.

SUMMARY

Various embodiments of the present disclosure can include systems, methods, and non-transitory computer readable media configured to receive virtual model information associated with a virtual deformable geometric model. The virtual model information comprises a complex rig comprising a plurality of transforms and a first plurality of vertices defined by a default model, and a simplified rig comprising a second plurality of transforms and a second plurality of vertices. The second plurality of vertices correspond to the first plurality of vertices defined by the default model. The simplified rig and the complex rig are deformed based on an animation to be applied to the virtual deformable geometric model. A set of offset data is calculated. The set of offset data comprises, for each vertex in the first plurality of vertices, an offset between the vertex and a corresponding vertex in the second plurality of vertices.

In an embodiment, the animation comprises a plurality of frames, and the set of offset data comprises, for each vertex in the first plurality of vertices and for each frame in the plurality of frames, an offset between the vertex and a corresponding vertex in the second plurality of vertices.

In an embodiment, an indication is received that the animation is to be applied to the virtual deformable geometric model in real-time in an immersive environment.

In an embodiment, the simplified rig is deformed in real-time based on the animation, and a complex model deformation is generated based on the deforming the simplified rig and the set of offset data.

In an embodiment, the second plurality of transforms represents a subset of the first plurality of transforms.

In an embodiment, the first plurality of transforms comprise a plurality of deformation transforms and a plurality of control transforms, and the second plurality of transforms comprises a subset of the plurality of deformation transforms.

In an embodiment, at least some of the first plurality of transforms are arranged hierarchically.

In an embodiment, at least some of the second plurality of transforms are arranged hierarchically.

In an embodiment, the simplified rig further comprises a set of skinning weights that define a relationship between the second plurality of transforms and the second plurality of vertices.

In an embodiment, each vertex in the second plurality of vertices is associated with no more than four transforms of the second plurality of transforms.

Various embodiments of the present disclosure can include systems, methods, and non-transitory computer readable media configured to receive virtual model information associated with a virtual deformable geometric model. The virtual model information comprises a complex rig comprising a plurality of transforms and a first plurality of vertices defined by a default model, and a simplified rig comprising a second plurality of transforms and a second plurality of vertices. The second plurality of vertices correspond to the first plurality of vertices defined by the default model. The simplified rig and the complex rig are deformed based on an animation to be applied to the virtual deformable geometric model. A set of offset data is calculated. The set of offset data comprises, for each vertex in the first plurality of vertices, an offset between the vertex and a corresponding vertex in the second plurality of vertices. A compressed version of the set of offset data is exported to a real-time processing engine for real-time animation of the virtual deformable geometric model.

In an embodiment, the compression version of the set of offset data is generated.

In an embodiment, the generating the compressed version of the set of offset data comprises calculating a tight bounding box for each vertex of the first plurality of vertices by, for each vertex of the first plurality of vertices, tracking minimum and maximum X, Y, and Z values of offsets for the vertex through the animation.

In an embodiment, the generating the compressed version of the set of offset data further comprises quantizing offsets in the set of offset data using integers of 16-bits or less based on the tight bounding boxes to generate a lower bit quantization of offset data.

In an embodiment, the generating the compressed version of the set of offset data further comprises combining the lower bit quantization of offset data with a video compression technique by mapping X, Y, and Z offset values to color component values.

In an embodiment, the generating the compressed version of the set of offset data further comprises combining the lower bit quantization of offset data with lossy or lossless audio compression techniques by mapping the X, Y, and Z offset values to channels of an audio stream.

In an embodiment, the generating the compressed version of the set of offset data further comprises combining the lower bit quantization of offset data with lossy or lossless photo compression techniques by mapping the X, Y, and Z offset values to the color component values of pixels in a photo and using adjacent pixels for sequential animation frames.

In an embodiment, the generating the compressed version of the set of offset data further comprises correlating each vertex of the first plurality of vertices to a pixel of a video stream.

In an embodiment, the correlating each vertex of the first plurality of vertices to a pixel of a video stream comprises correlating each vertex of the first plurality of vertices to a pixel of a video stream by mapping each vertex of the first plurality of vertices to a texture location using a texture lookup or by using an indexing scheme.

In an embodiment, the generating the compressed version of the set of offset data comprises clustering the set of offset data to generate a plurality of clusters, and further wherein the clustering the set of offset data comprises clustering the set of offset data using K-means.

In an embodiment, the generating the compressed version of the set of offset data comprises clustering the set of offset data to generate a plurality of clusters; and applying Principal Component Analysis (PCA) to each cluster of the plurality of clusters.

In an embodiment, the generating the compressed version of the set of offset data comprises representing changes across time for offsets of the set of offset data using an approximating parametrized analytical function; and retaining only a subset of the parameters of the approximating parametrized analytical function Various embodiments of the present disclosure can include systems, methods, and non-transitory computer readable media configured to identify a virtual deformable geometric model to be animated in a real-time immersive environment. The virtual deformable geometric model comprises a virtual model mesh comprising a plurality of vertices, a plurality of edges, and a plurality of faces. The virtual model mesh is iteratively refined in one or more iterations to generate a refined mesh. Each iteration of the one or more iterations increases the number of vertices, the number of edges, and/or the number of faces. The refined mesh is presented during real-time animation of the virtual deformable geometric model within the real-time immersive environment.

In an embodiment, the real-time immersive environment is a virtual reality environment or an augmented reality environment.

In an embodiment, the refined mesh comprises a second plurality of vertices, and each vertex of the second plurality of vertices is a linear weighted combination of vertices in the plurality of vertices.

In an embodiment, each linear weighted combination of vertices comprises one or more weights, and the method further comprises pre-computing the one or more weights for each linear weighted combination prior to real-time animation of the virtual deformable geometric model within the real-time immersive environment.

In an embodiment, each linear weighted combination is limited to a pre-defined maximum number of weights.

In an embodiment, for each vertex of the second plurality of vertices having a plurality of weights greater than the pre-defined maximum number of weights, a subset of weights is selected from the plurality of weights for inclusion in the linear weighted combination based on absolute magnitudes of the weights.

In an embodiment, an approximate normal vector and an approximate tangent vector is calculated for each vertex in the second plurality of vertices.

In an embodiment, each vertex in a first subset of vertices of the second plurality of vertices has exactly four adjacent vertices; the calculating the approximate normal vector for each vertex of the first subset of vertices comprises, for each vertex in the first subset of vertices, calculating an approximate normal vector based on the four vertices adjacent to the vertex; and the calculating the approximate tangent vector for each vertex of the first subset of vertices comprises, for each vertex in the first subset of vertices, calculating an approximate tangent vector based on the four vertices adjacent to the vertex.

In an embodiment, each vertex in a first subset of vertices of the second plurality of vertices has greater than four adjacent vertices; the calculating the approximate normal vector for each vertex of the first subset of vertices comprises, for each vertex of the first subset of vertices, selecting four vertices adjacent to the vertex, and calculating an approximate normal vector based on the selected four vertices adjacent to the vertex; and the calculating the approximate tangent vector for each vertex of the first subset of vertices comprises, for each vertex in the first subset of vertices, calculating an approximate tangent vector based on the selected four vertices adjacent to the vertex.

In an embodiment, each vertex in a first subset of vertices of the second plurality of vertices has fewer than four adjacent vertices; the calculating the approximate normal vector for each vertex of the first subset of vertices comprises, for each vertex of the first subset of vertices, determining a set of four vertices associated with the vertex, the set of four vertices comprising all vertices adjacent to the vertex and the vertex itself substituted for any missing vertices, and calculating an approximate normal vector for the vertex based on the set of four vertices; and the calculating the approximate tangent vector for each vertex of the first subset of vertices comprises, for each vertex in the first subset of vertices, calculating an approximate tangent vector based on the set of four vertices.

Various embodiments of the present disclosure can include systems, methods, and non-transitory computer readable media configured to identify a virtual character being presented to a user within a real-time immersive environment. A first animation to be applied to the virtual character is determined. A nonverbal communication animation to be applied to the virtual character simultaneously with the first animation is determined. The virtual character is animated in real-time based on the first animation and the nonverbal communication animation.

In an embodiment, the nonverbal communication animation is determined based on a user input associated with the user.

In an embodiment, the user input comprises location and orientation information associated with a set of feature locations on the user that are tracked in the immersive environment.

In an embodiment, the nonverbal communication animation comprises a looking animation to cause the virtual character to look at one or more feature locations of the set of feature locations on the user based on the location and orientation information.

In an embodiment, the nonverbal communication animation comprises a looking animation to cause the virtual character to look alternatingly at two or more objects in the real-time immersive environment, wherein the two or more objects include at least two of: a head of the user, a hand of the user, a feature location on the body or face of the user, another user in the real-time immersive environment, a second virtual character in the real-time immersive environment, or a simulated object in the real-time immersive environment.

In an embodiment, the location and orientation information comprises head location and orientation information associated with the head of the user, and the nonverbal communication animation comprises a mirroring animation to cause the virtual character to mirror head movements by the user based on the head location and orientation information.

In an embodiment, the location and orientation information further comprises hand location and orientation information associated with one or more of the user's hands.

In an embodiment, the animating the virtual character in real-time based on the first animation and the nonverbal communication animation comprises layering the nonverbal communication animation with the first animation.

In an embodiment, the nonverbal communication animation is determined based on virtual environment state information associated with the immersive environment.

In an embodiment, the nonverbal communication animation comprises increasing an activity level of the virtual character based on the virtual environment state information.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 12 illustrates an example method to calculate compressed vertex offset data between the vertices of a complex and a simple character model, according to an embodiment of the present disclosure.

FIG. 13 illustrates an example method to generate a refined mesh from a base mesh, according to an embodiment of the present disclosure.

Figure 1A:
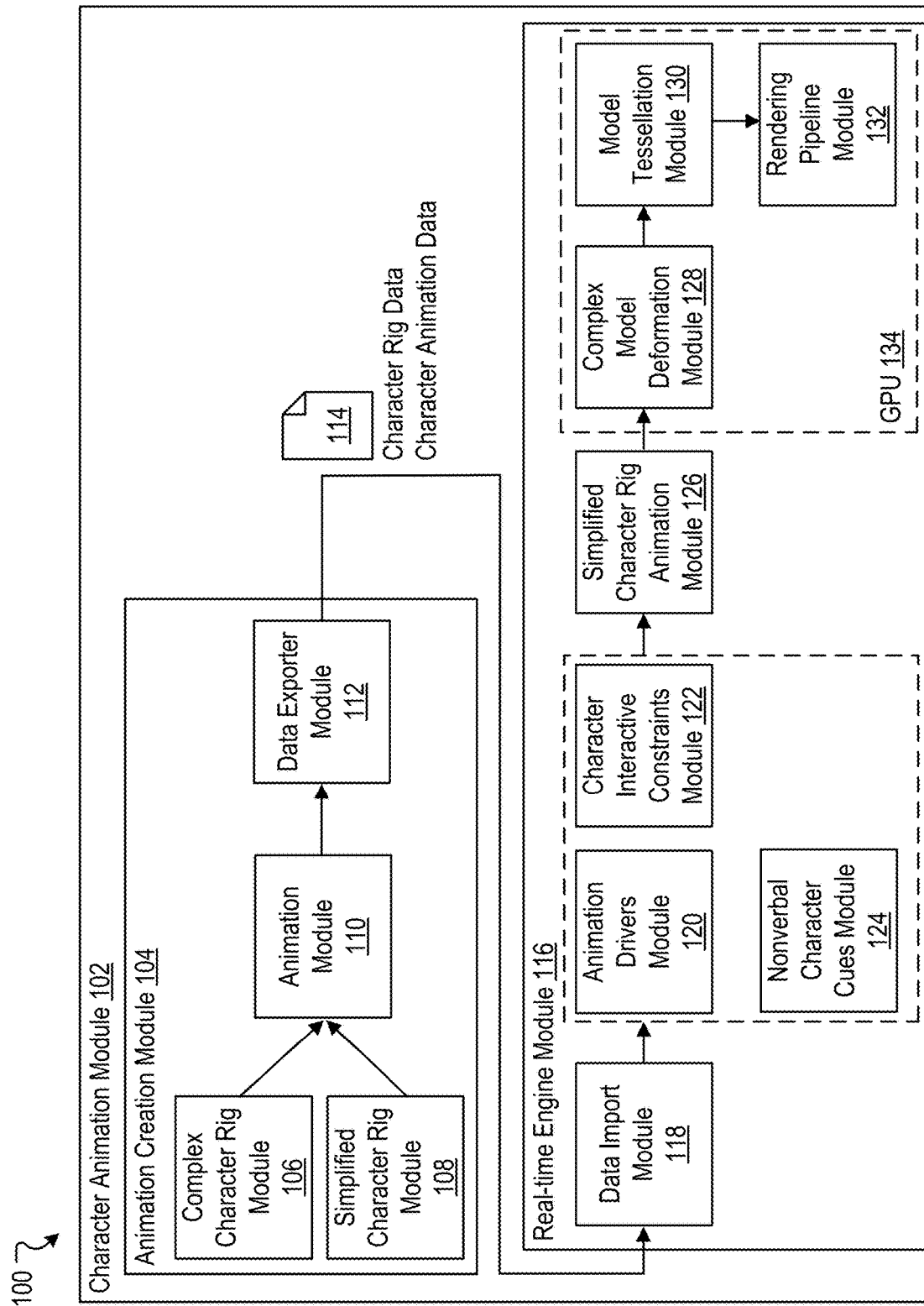
FIG. 1A illustrates an example system including a character animation module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Real-Time Complex Model Animations and Interactivity

Virtual Reality (VR) and Augmented Reality (AR) are new mediums for entertainment and storytelling that enable content creators to immerse the viewer in ways that are not possible in other mediums. VR and AR are powerful immersive platforms to tell engaging stories with characters that audiences can empathize with, much as one would experience in literature or cinema. However, unlike film experiences, VR and AR provide the opportunities for the digital characters to interact with and react to the viewer in real time because the viewer is fully immersed in the virtual world of the story.

Digital characters often begin as a neutralized 3D model (often called the "default model"). A character "rig" is a digital puppet that enables character models to be animated so that they can move, locomote, and emote, all in a believable way, giving the illusion of life. The character rig takes static default character models as inputs and then applies a set of procedural modifications to these models based on animation input controls (such as how many degrees the elbow is bent or how much the mouth of a character is smiling), producing a deforming, expressive character that animates over time. The character rig typically comprises a set of animation controls which drive an underlying hierarchy or collection of skeletal joints or bones. This process is often referred to as the motion system of the character. Then deformation layer(s) attach or bind the character models to these animated skeletons using a variety of techniques.

Conventional approaches to character animation have generally involved different levels of quality for real-time applications (such as video games, VR, and/or AR) and non-real-time applications (such as feature films). It can be appreciated that computing constraints inherent in most real-time applications have resulted in real-time applications generally utilizing lower quality animations than non-real-time applications. Video games will typically render a single viewpoint at 30 or 60 frames per second (FPS). VR projects have even greater computing requirements, as they will generally render two viewpoints (one for each eye) at 90 FPS. As such, conventional approaches to VR and AR, as well as most video games, use variations of skinning and morph targets, which are simple character deformation techniques that result in lower quality character animations, but are optimized to run in real-time. In character rigs intended for real-time applications, "skinning" is a technique commonly used to bind the default model's skin to the rig's bones. Each bone is associated with a set of vertices on the skin that are affected by the movement of the bone. Each skin vertex can be affected by multiple bones. Character rigs for real-time applications typically place limits on the number of bones that each skin vertex can be associated with as well as the number of overall bones in the rig, so that the character can be deformed in real-time. In real-time character rigs, facial performances are often captured as a set of blend shapes or morph targets. A face rig can consist of a number of modeled face shapes (such as a smile pose) that are blended on or off by the animator.

Conversely, in a character rig for feature films, the constraints associated with real-time animation are not applicable and, as such, a wider range of techniques can be applied to produce the animated character models. A more sophisticated set of deformers as well as multiple deformation layers may be employed to capture the complexities of musculature, fat, and skin or to maintain specific visual qualities of the shape or silhouette of a character. Facial performances are not limited to blend shapes and may contain many deformation layers to capture all the intricacies of the face. In many cases, complex character rigs may run physically-based simulations to more accurately depict long hair, clothing, muscles, and skin sliding on top of anatomy. Complex feature-film rigs do not need to run in real-time and it is typical to compute the final character models offline using a distributed cluster of computers, especially with simulated elements. Due to restrictions on computing resources inherent in real-time processing, conventional approaches to character animation in real-time applications, such as gaming and VR, result in animations that lack the quality, complexity, and richness of character animations in non-real-time applications such as feature films.

An improved approach rooted in computer technology overcomes the foregoing and other disadvantages associated with conventional approaches specifically arising in the realm of computer technology. In general, the present technology provides an innovative system designed for any simulated immersive environment, which includes VR and AR but also extends to other immersive scenarios such as holographic technologies and brain-computer interfaces. Immersive environments may collectively be referred to as VR for simplicity, as appropriate. The present technology can be applicable to many domains such as entertainment, medical, training, and education contexts. Although many of the features described herein will be described with reference to VR and AR entertainment, it will be understood that the present technology can be applied to any simulated or immersive environment with a broad range of applications beyond entertainment, and the features discussed herein represent one specific example application. In various embodiments, the present technology provides an innovative system designed for VR and AR entertainment (which may collectively be referred to as VR for simplicity, as appropriate) that creates high-quality animations, including character animations, with all the visual fidelity and acting subtlety that one would expect from a feature film, or other non-real-time animation applications, but can run on VR computing devices in real-time. The present technology enables VR character performances that are both highly expressive and are highly responsive to user inputs. The present technology can be the backbone for creating truly immersive VR experiences that place the user inside the story, where the user is a character and can interact with other characters and participate in the narrative. The present technology enables VR experiences that combine the empathy of a film with the agency of a game but with the motivations of real life.

Some benefits of the present technology compared to conventional approaches include:

high quality virtual representations of virtual deformable geometric models, including both characters and other aspects of a virtual environment with simulated movement;

high quality character performances, both in visual fidelity and animation (movement) quality, rendered in real-time for VR, that can be responsive to user inputs;

feature film quality facial performances running in real-time VR experiences that can dynamically respond to user input;

character simulations for skin, cloth, and hair running in real-time VR experiences;

smooth subdivision surface models running in real-time VR experiences;

character visual fidelity is not limited by fast but low-quality techniques (such as skinning) that can run in real-time game engines;

decoupling the character animation pipeline from the real-time engine pipeline; and the ability to run on VR headsets tethered to high-end computers, as well as the ability to scale down to run on less powerful devices such as mobile-driven VR headset devices, AR devices, and other immersive technologies.

The present technology enables artists to create high-quality character animations with all the subtlety that one expects from a feature film, but running in real-time in a real-time engine where the results can be procedurally modified by the real-time engine. The present technology removes restrictions on real-time animated character performances by allowing for arbitrarily complex character setups in the animation creation tool. The disclosed real-time engine pipeline allows for full character interactivity by blending cycle animations together based on game logic and user inputs to produce deformed complex character models that are rendered as smooth subdivision surfaces instead of hard-edged polygonal models. More details relating to the disclosed technology are provided below.

FIG. 1A illustrates an example system 100 including a character animation module 102, according to an embodiment of the present disclosure. The character animation module 102 can be implemented in one or more software applications running on one or more computing devices. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the character animation module 102 can be implemented in any suitable combinations.

As shown in the example of FIG. 1A, the character animation module 102 can include an animation creation module 104 and a real-time engine module 116. As also shown in the example of FIG. 1A, the animation creation module 104 can include a complex character rig module 106, a simplified character rig module 108, an animation module 110, and a data exporter module 112. As further shown in the example of FIG. 1A, the real-time engine module 116 can include a data import module 118, an animation drivers module 120, a character interactive constraints module 122, a nonverbal character cues module 124, a simplified character rig animation module 126, a complex model deformation module 128, a model tessellation module 130, and a rendering pipeline module 132. In an embodiment, the complex model deformation module 128, the model tessellation module 130, and/or the rendering pipeline 132 may be implemented, in part or in whole, using a graphics processing unit (GPU) 134.

In some embodiments, the various modules and/or applications described herein can be implemented, in part or in whole, as software, hardware, or any combination thereof. In general, a module and/or an application, as discussed herein, can be associated with software, hardware, or any combination thereof. In some implementations, one or more functions, tasks, and/or operations of modules and/or applications can be carried out or performed by software routines, software processes, hardware, and/or any combination thereof. In some cases, the various modules and/or applications described herein can be implemented, in part or in whole, as software running on one or more computing devices or systems, such as on a user or client computing device or on a server. For example, one or more modules and/or applications described herein, or at least a portion thereof, can be implemented as or within an application (e.g., app), a program, or an applet, etc., running on a user computing device or a client computing system. In another example, one or more modules and/or applications, or at least a portion thereof, can be implemented using one or more computing devices or systems that include one or more servers, such as network servers or cloud servers. It should be understood that there can be many variations or other possibilities.

The complex character rig module 106 can be configured to receive and maintain data defining a complex character rig for a digital virtual character. In general, a complex character rig can be associated with and/or include a default character model having a plurality of vertices. The complex character rig can further comprise a set of animation controls which drive an underlying set (e.g., hierarchy, collection) of transforms, defining 3D positions and orientations. As previously described, these transforms are typically represented as skeletal joints or bones in a character rig. The complex skeletal rig joints deform and move the vertices in the default character model. In certain embodiments, skeletal joints can comprise 3D point positions (without orientation transform information). In certain embodiments, skeletal joints can comprise a combination of point positions and full transforms. In certain embodiments, a collection of joints may be constructed in a hierarchy. However, in other embodiments, a collection of joints may not be arranged hierarchically. Furthermore, the presently disclosed technology can be applied to any arbitrary set of points and transforms that drive geometric deformations. Although many of the features described herein will be described with reference to character deformations driven by skeletal joints, it will be understood that the present technology can be applied to any deformable geometric models driven by an arbitrary set of points and transforms, and the deformations to virtual character models discussed herein represent one specific example application. A rigging artist can create a complex character rig that, in various embodiments, may utilize a variety of techniques, including a range of deformers, multiple deformation layers, and physically-based simulations. In certain embodiments, a set of deformation joints are derived from the skeletal control joints and these deformation joints drive the geometric deformation layers. Deformation joints provide a separation and encapsulation of the deformation layers from the skeletal components. In certain embodiments, the complex character rig can employ multiple deformation layers to capture the complexities of various materials such as, for example, musculature, fat, and skin, or to maintain specific visual qualities of the shape or silhouette of a character. In certain embodiments, the complex character rig contains multiple sets of deformation joints corresponding to the various deformation layers. In certain embodiments, a combination of skeletal joints and deformation joints drive the geometric deformations. The complex character rig can also include facial performances that may contain many deformation layers to capture all the intricacies of the face. In various embodiments, the complex character rig can run physically-based simulations to more accurately depict elements of the character, such as long hair, clothing, muscles, skin sliding on top of anatomy, and so forth. The complex character rig may also incorporate sophisticated facial animation setups to capture both exaggerated facial expressions and subtle details. The disclosed technology removes any restrictions on the character rigs by separating the front-end character setup, animation, and pipeline (i.e., the animation creation module 104) from the real-time character systems that run in the real-time processing engine (i.e., the real-time engine module 116), as will be described in greater detail herein. As such, in various embodiments, the complex character rig may not have specific data requirements apart from comprising a default character model as input and a joint hierarchy.

The simplified character rig module 108 can be configured to receive, maintain, and/or generate data defining a simplified character rig to represent a digital virtual character. In an embodiment, the simplified character rig can be associated with a complex character rig generated, received, and/or maintained by the complex character rig module 106. In an embodiment, the simplified character rig can comprise a set of skeletal joint transforms (akin to the skeletal joints in the complex character rig). In various embodiments, the simplified skeletal joint transforms may be defined independently from the complex character rig, and may or may not be hierarchical. In one embodiment, the simplified character rig may be a simplified version of a complex character rig. For example, the simplified character rig may comprise a simplified skeleton representing a subset of skeletal joints present in the complex character rig skeleton, and excluding all animation control data from the complex character rig skeleton (e.g., excluding one or more control joints from the complex character rig skeleton). In an embodiment, a simplified character rig can comprise the simplified skeletal joint hierarchy, default model information defining a default character model (for example, this may be the same default character model included in the complex character rig), a skinning weight map that defines the relationship between the simplified skeleton and the vertices in the default character model, and one or more blend shapes. In an embodiment, the simplified character rig can be a limited skinned character rig, wherein each vertex in the default character model may be attached to no more than a maximum number of bones, e.g., no more than 4 bones, in the simplified skeleton. In certain embodiments, the simplified character rig can consist of more complex deformers in addition to skinning (such as lattices or smoothing deformers) supported by the real-time engine module 116. In certain embodiments, the simplified character rig can be created manually by a rigging artist. In certain embodiments, the simplified character rig can be derived automatically from a complex character rig by using statistical or machine learning methods. For example, a training set can be constructed by using calisthenic animation poses with the targets being the deformed model control vertices for the complex character rig. A cost function can be defined that computes the difference between the complex deformed control vertices and the simplified control vertices. The vertex attachments and the export rig skinned weight maps can then be learned to minimize this cost function The animation module 110 can be configured to receive animation data for a complex character rig and/or a simplified character rig. Animation for a given project can be broken up into a series of shots or clips. A given shot or clip can include one or more virtual characters, each represented by and/or associated with a complex character rig and a simplified character rig. For a given shot, an animator can hand-animate or keyframe the character rigs (complex and/or simplified) for the one or more characters over time or the animation can be motion captured from a live performance by an actor or a combination of multiple techniques. In certain embodiments, one shot can represent a single character action (which may also be referred to as an animation cycle or cycle animation). The animation module 110 can be configured to output animation data for one or more shots. The output animation data for a shot can include the simplified character's animated skeletal joint data for each virtual character along with any other relevant scene data (such as locations of props and environment elements). Animating virtual characters with the present technology provides the important benefit that, unlike conventional approaches to real-time character animation, there are no restrictions placed on the complex character rigs, as described above. As such, animators are able to achieve much stronger character performances than in a conventional pipeline.

The data exporter module 112 can be configured to export character rig data for a single or multiple character rigs and character animation data 114 for a set of animations. The character rig data and the character animation data 114 can be exported for use by a real-time processing engine (e.g., real-time engine module 116). Character rig data can include, for example, character default model information (e.g., vertex positions, mesh topology), joint hierarchy data, simplified character rig skin weight maps, data relating to any additional deformers for a simplified character rig, and the like. In an embodiment, character rig data can be exported once per character (i.e., not per frame of animation).

In an embodiment, character animation data relating to one or more animations to be applied to virtual characters can be exported per character per frame of animation. Some examples of character animation data can include local space animated joint transforms relative to the simplified rig's joint hierarchy and character model control vertices. In an embodiment, the character model control vertices can include complex character mesh data that is stored as offset positions relative to the mesh of a simplified character rig in a space that is a weighted average of skinned weight map joints of each vertex. As will be described in greater detail below, offsets can be calculated for each vertex in a character model for each frame in each animation. The offsets can be used by the real-time engine module 116 to effectuate deformation of a complex character rig by deforming a simplified character rig instead and then applying the offsets to the vertices in the character model. The data exporter module 112 can either store this data locally on disk or send it to a remote server. Exporting per-frame vertex offset data can lead to large datasets being stored on disk or transferred over a network to a remote server. Various embodiments of the present technology provide for multiple forms of lossy or lossless compression to reduce the export data size. Some examples of compression techniques can include reducing data over time by curve fitting vertex offsets across animation frames or reducing a number of stored vertices by using statistical or machine learning techniques such as Principal Component Analysis (PCA). More details regarding the data exporter module 112 will be provided below with reference to FIG. 2.

The data import module 118 can be configured to import character rig data and character animation data 114. In an embodiment, the data import module 118 can load the character rig data and character animation data 114 exported by the data exporter module 112 on demand as needed via an asynchronous data manager. In various embodiments, the asynchronous data manager can load the data from a local disk or from a remote server. In an embodiment, the asynchronous data manager can import the character rig data and character animation data into a real-time game engine (e.g., real-time engine module 116).

Figure 1B:
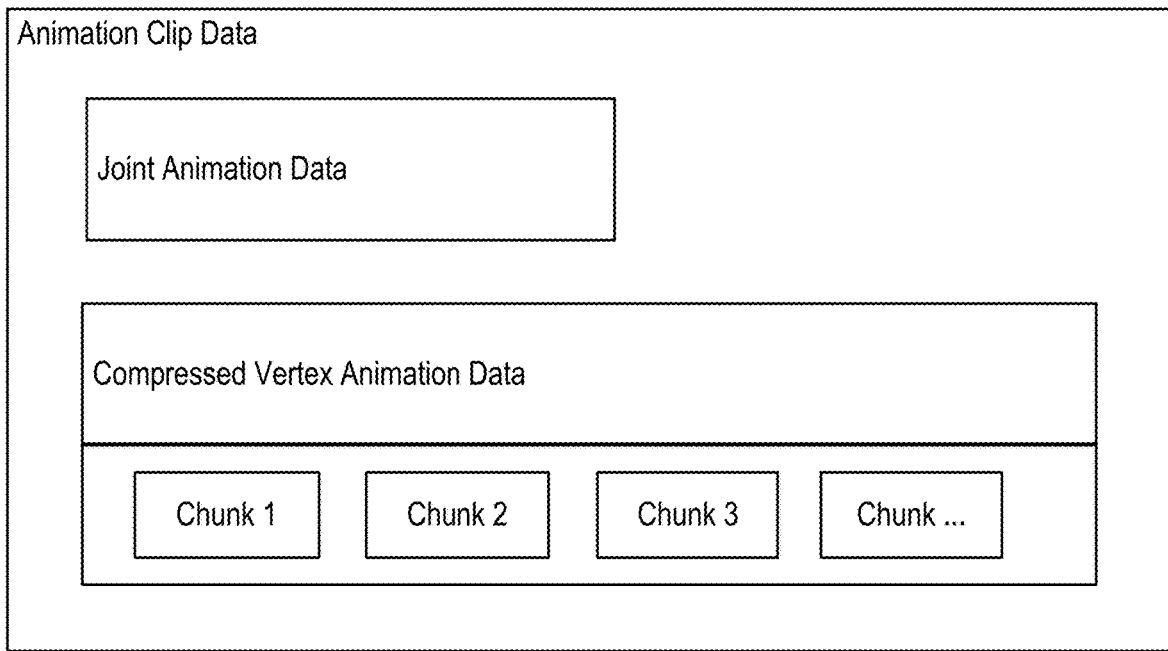
FIG. 1B illustrates a block diagram representation of an example of animation clip data, according to an embodiment of the present disclosure.

As noted previously, the character animation data can include a significant amount of data, as it comprises data, such as offset data, for one or more characters for each frame of an animation. In an embodiment, the character animation data can be conditioned so that it can be quickly consumed at runtime. FIG. 1B provides a block diagram representation of how character animation data can be conditioned in this way. As mentioned above, character animation data can comprise data pertaining to one or more animation clips. In the example of FIG. 1B, a set of animation clip data includes a simplified rig's joint animation data (e.g., animated joint transforms for the simplified rig's joint hierarchy) and compressed vertex animation data (e.g., vertex offsets for each model control relative to the simplified rig). The compressed vertex animation data is sliced into small chunks (e.g., 256 frames) that can be streamed to a GPU (e.g., GPU 134) asynchronously during runtime without stalling. This animation clip data can be fed from the local machine or streamed from cloud-based servers. In order to ensure that streaming of character animation data to the GPU does not cause hitches, the data import module 118 can implement a centralized scheduler to queue and stream slices of animation as needed. As mentioned above, character animation data can include data pertaining to a plurality of animation clips. In certain embodiments, a first chunk (e.g., 256 frames) of all animation clips can be streamed to GPU memory at VR application startup. In certain embodiments, the data import module 118 can stream character animation data stored locally on a VR device for optimal load performance. This however can lead to a large VR application footprint (e.g., large local storage usage). Alternatively, the data import module 118 can stream the character animation data from a remote server. In certain embodiments, as needed during VR application use, additional chunks can be fetched and stored locally in anticipation of being streamed to the GPU, while chunks no longer needed can be discarded from local storage, in a manner that balances availability of local storage and streaming speed between the local machine and cloud-based servers.

Returning to FIG. 1A, the animation drivers module 120 can be configured to drive animation cycles. Real-time processing engines provide a number of mechanisms to drive or blend between different cycle animations. For example, timeline-based linear editing tools can be used to create narrative experiences such as in-game cinematics. State machines can allow interactive games to blend between different cycles and create complex character behaviors based on user interactions. In certain instances, engineers can also program procedural artificial intelligence (AI) for even more sophisticated character response.

The character interactive constraints module 122 can be configured to place constraints on character rig joint locations. In order to blend between cycle animations and to create believable character responses, it may be desirable to place constraints on joint locations for a character. To blend between a set of animation cycles, the character interactive constraints module 122 can linearly interpolate between the set of joint hierarchies. To place additional constraints such as making a character look at a specified location, the character interactive constraints module 122 can directly modify specific joint locations (such as the neck and head joints). The present technology also enables a rich set of constraints including, for example, supporting regional layering of joint hierarchies to effectuate layering together animation cycles (i.e., one on top of another).

The nonverbal character cues module 124 can be configured to modify and/or adjust character rig joint locations based on user and scene inputs. Humans use subconscious communication cues to build emotional connections. These nonverbal cues are critical to building meaningful relationships with each other in the real world. VR has the unique capabilities to immerse the viewer fully in an experience, to enable the viewer to be a character in the experience with a virtual embodiment, and to faithfully track the viewer's movements (e.g., using head and hand locations). These are key ingredients to building meaningful subconscious communication cues into a VR system and are not possible in conventional film or games. In an embodiment, the nonverbal character cues module 124 can use user inputs, such as user head and hand inputs, to incorporate complex nonverbal character responses into VR animations. Example use cases include 1. Looking at a user/maintaining eye contact
2. Mirroring behavior of a user
3. Increased activity
4. Dynamic performances.

As mentioned, the nonverbal character cues module 124 can receive user inputs to generate nonverbal communication animations by modifying one or more joints and/or vertices of a character rig. In an embodiment, the nonverbal character cues module 124 can receive user input data from a VR platform that tracks a user in real-time. For example, the nonverbal character cues module 124 can use a head-mounted display (HMD) position and orientation as well as hand controller position(s) and orientation(s) to accurately track the locations and orientations of the head and hands of a user. In another embodiment, the nonverbal character cues module 124 can receive additional tracked inputs such as data pertaining to the position and orientation of additional real-world objects that are incorporated into a VR experience. In another embodiment, the nonverbal character cues module 124 can receive full body and facial tracking for a user which provides more sophisticated user inputs to the system. In another embodiment, the nonverbal character cues module 124 can receive one or more user inputs from users who express their emotions through assistive technologies such as tongue controllers, eye scanners, or brain-computer interfaces. In another embodiment, the nonverbal character cues module 124 can receive one or more user inputs from multiple users in a shared social experience.

The nonverbal character cues module 124 can also be configured to receive inputs from a VR scene and generate nonverbal communication animations based on scene inputs. For example, the nonverbal character cues module 124 can utilize virtual character joint locations as inputs as well as other environmental inputs such as the location of various props in the VR scene. The system can also use state information associated with a VR experience.

Nonverbal communication animation data output by the nonverbal character cues module 124 can cause nonverbal communication animations to be layered on a virtual character's animated performance based on user and scene inputs. For example, a source animation or base animation that a virtual character is to perform may be determined, and a separate nonverbal communication animation may also be determined. The source animation may cause the virtual character to be animated in a first manner (e.g., may define a first set of orientations and/or locations for a set of joints of an animation rig). The nonverbal communication animation data can cause one or more joint locations of an animation rig to be further adjusted to create a modified set of joint locations. For example, a base animation may cause a virtual character to walk toward a user. A separate mirroring nonverbal communication animation may cause the virtual character to mirror the user while the virtual character is walking toward the user. Or a separate looking nonverbal communication animation may cause the virtual character to maintain eye contact with the user while the virtual character is walking toward the user. Procedural joint modification provides an intuitive and direct mechanism to modify existing animations. In another embodiment, one or more nonverbal communication animations and layers can be blended together. The blending or layering of animations can occur across all the animation rig joints or only for a specific subset or region of joints. This approach enables artists to explicitly animate a nonverbal performance. The nature of the blending can be arbitrarily complex. More details regarding the character nonverbal communication module 124 will be provided below with reference to FIG. 3.

The simplified character rig animation module 126 can be configured to receive animation drivers (e.g., from the animation drivers module 120), interactive constraints (e.g., from the character interactive constraints module 122), and nonverbal communication animation data (e.g., from the nonverbal character cues module 124) as inputs, and animate a simplified character rig joint hierarchy based on those inputs. The simplified character rig animation module 126 can receive a set of animation clips, blending weights, and times from the animation drivers module 120. Character animation data for the set of animation clips can be received from the data import module 118. Modifications to the animation data may be received from the nonverbal character cues module 124. Next, the simplified character rig animation module 126 can update the simplified character rig joint hierarchy based on animations and blending. Finally, the simplified character rig animation module 126 can modify joint locations based on the interactive constraints received from the character interactive constraints module 122.

The simplified character rig animation module 126 can be configured to trigger, blend, and/or layer one or more animations in a real-time engine. This may be achieved in a variety of ways, including through the use of state machines, nonlinear timeline tools, and/or event-based triggers. Animations can be combined and blended wholly, or partially using predefined masks. This provides the ability to create layered performances. For instance, facial performance or hand gestures may be modified based on user input or actions. The simplified character rig animation module 126 can blend local joint transforms and calculate weights of vertex offsets to drive the complex model deformation module 128 (discussed in greater detail below).

The complex model deformation module 128 can be configured to compute final character model deformations based on the simplified character rig animation conducted by the simplified character rig animation module 126 and vertex offset data. As discussed above, character animation data exported by the data exporter module 112 and imported by the data import module 118 can include per-frame vertex offset data detailing per-frame offsets for each vertex in a character model for every frame of an animation. The vertex offset data can be used to simulate a complex character rig deformation although only a simplified character rig has actually been deformed in real-time. For every control vertex on the character mesh, the complex model deformation module 128 can apply the simplified character rig joint skinning to the modified joint hierarchy as well as any additional simplified character rig mesh deformers (such as lattices or smoothing) and then apply the vertex offsets of the complex character rig mesh. This may involve blending between sets of vertex offsets from different animations and/or layering vertex offsets from different animations based on the animation drivers. More details regarding the complex model deformation module 128 will be provided below with reference to FIG. 4.

The model tessellation module 130 can be configured to tessellate and render character models. Polygonal models can be tessellated and rendered, but this makes the final character deformations look rough and faceted (a look traditionally associated with game characters). To make the final models appear smooth and high fidelity (a look associated with feature film characters), the model tessellation module 130 can, in one embodiment, tessellate and render Catmull-Clark subdivision surfaces in real-time. The model tessellation module 130 can tessellate one subdivision iteration on the deformed complex model and calculate vertex normals and tangents. This subdivided, tessellated model can then be handed off to the rendering pipeline module 132 for rasterization. More details regarding the model tessellation module 130 will be provided below with reference to FIG. 5.

Figure 2:
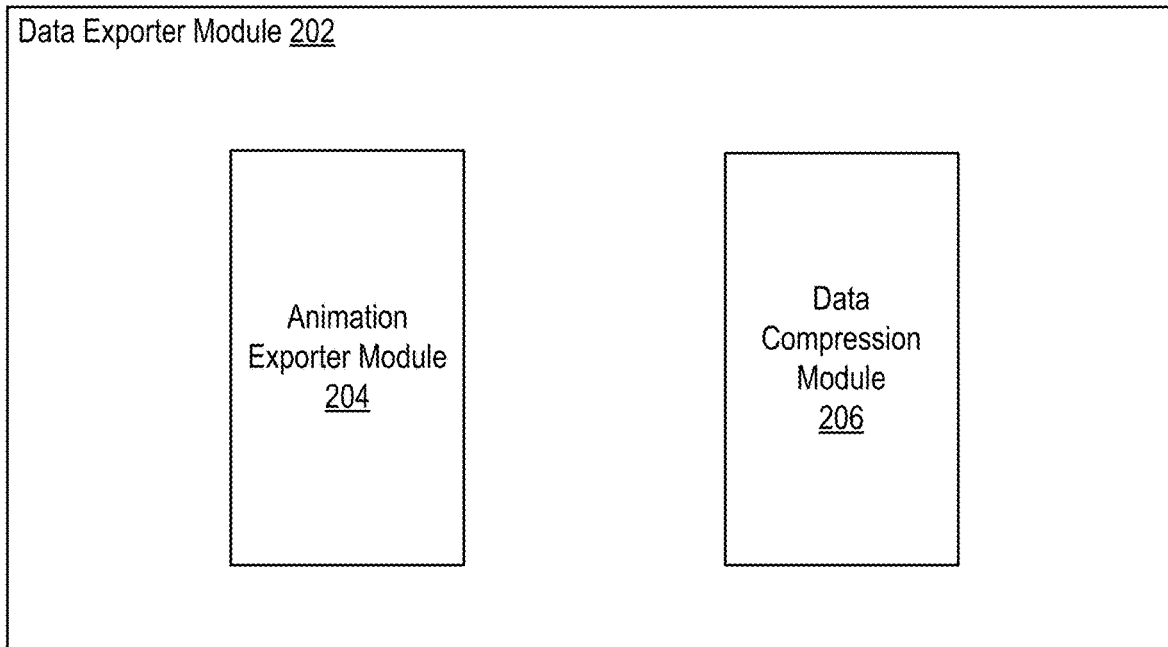
FIG. 2 illustrates an example data exporter module, according to an embodiment of the present disclosure.

FIG. 2 illustrates an example data exporter module 202 according to an embodiment of the present disclosure. In some embodiments, the data exporter module 112 of FIG. 1A can be implemented as the data exporter module 202. As shown in the example of FIG. 2, the data exporter module 202 can include an animation exporter module 204 and a data compression module 206.

The animation exporter module 204 can be configured to generate and export character animation data for use by a real-time processing engine (e.g., real-time engine module 116). In an embodiment, the animation exporter module 204 can receive at least two inputs: (1) world-space positions of all vertices of a complex character rig; and (2) a simplified character rig. In one embodiment, the simplified character rig can include (a) a simplified skeleton representing a subset of the important deformation joints of the complex character rig with control joints excluded; (b) a full-resolution copy of the character model; (c) a set of skinning weights that provide the relationship between the skeleton and the model; and (d) a skinning model (e.g., linear blend skinning or dual quaternion skinning). For each frame in an animation, and for each vertex in the model, the animation exporter module 204 can be configured to calculate an offset between the complex character rig and the deformed result of the simplified character rig relative to the weights and influencing transform matrices of the simplified character rig.

In an embodiment, the linear blend skinning equation (with four joints) may be represented as:

$$v' = (v)\sum_{n=1}^{4} w_n(R_n^{-1})(M_n)$$

where v' is the deformed vertex position, v is the reference position of the vertex, w is the skinning weight for the given joint, R is the transform of the given joint in its reference state, and M is the transform of the given joint in the deformed state.

The summation can be factored out to produce a combined transform, S:

$$S = \sum_{n=1}^{4} w_n(R_n^{-1})(M_n)$$

The offset (o) can then be calculated:

$$o = v''(S^{-1}) - v$$

where v'' is the world-space position of the vertex from the complex character rig, S is the combined transform produced by the simplified character rig, and v is the reference position of the vertex. It should be noted that S can be produced by other skinning methods, such as dual quaternion skinning. S can also be generated from additional deformers such as lattices and smoothing operations.

The data compression module 206 can be configured to compress data to be exported by the data exporter module 202. The data exported by the data exporter module 202 (e.g., character rig data, character animation data) has both spatial and temporal coherence, making it highly compressible.

In certain embodiments, tight bounding boxes can be calculated for each vertex of a character model over an animation, allowing vertex offsets to be quantized using low-order (e.g., 8 or 16 bit) integers while maintaining sub-millimeter accuracy. In an embodiment, the data compression module 206 can be configured to calculate tight bounding boxes for each vertex in a model by tracking the minimum and maximum X, Y, and Z values of the offsets for the vertex throughout an animation. The vertex offsets can then be embedded into the bounding boxes using low-order integers. In certain embodiments, an 8-bit quantization may be used. In many instances, an 8-bit quantization shows no visible loss of precision, while providing a 4× improvement over a 32-bit single precision floating point representation of the data. In certain embodiments, the low-order integers may represent real-world distances in a non-linear fashion so that they better capture vertex offset distributions across an animation where a bias is observed towards the center of the bounding box as compared to its faces (e.g. the 8-bit values are not interpreted as integers, but instead are treated as floating point numbers with a 1-bit sign, 5-bit mantissa and 2-bit exponent). In certain embodiments, the low-order integers may represent incremental real-world distances between successive animation frames (e.g. successive offsets with values 1, 2, 5, and 4 are represented as 1, +1 (=2−1), +3 (=5−2), and −1 (=4−5)).

In various embodiments, the data compression module 206 can be configured to combine the 8-bit or 16-bit quantization of a character animation with lossy or lossless audio compression techniques, such as MP3 and WAV, by mapping the X, Y, and Z vertex offset values to three channels of a single multi-channel audio stream. In various embodiments, the data compression module 206 can be configured to combine the 8-bit or 16-bit quantization of a character animation with lossy or lossless photo compression techniques, such as JPEG and PNG, by mapping the X, Y, and Z vertex offset values to the R, G, and B color values of the photo's pixels, and using adjacent pixels for sequential animation frames. In various embodiments, the data compression module 206 can be configured to combine the 8-bit or 16-bit quantization of a character animation with lossy or lossless video compression techniques, such as H.264, H.265, and VP9, by mapping the X, Y, and Z vertex offset values to the R, G, and B color values of the video frames. Many computing devices used for AR and VR, such as mobile devices (e.g., phones, tablets) and computers, contain dedicated hardware to decode popular photo, audio, and/or video compression formats while minimizing consumption of CPU or GPU resources.

In various embodiments, the data compression module 206 can be configured to apply statistical analysis and machine learning techniques to take advantage of the spatial and temporal coherence of the data exported by the data exporter module 202. As one example implementation, Principal Component Analysis (PCA) can identify a lower dimensional space to project all the target poses (animation frame data within the character animation data) such that the character animation data can be recreated within a given level of acceptable error (e.g., within 99% accuracy). A clustered PCA approach can be used in conjunction with a clustering algorithm like K-means to achieve better results. In certain embodiments, parametrized analytical approximate representations (e.g., polynomials, sinusoidal functions, spline curves such as clamped cubic Bezier curves) of vertex offsets over time provide an opportunity for significant savings through keyframe reduction techniques. In certain embodiments, spline curves approximately represent the vertex offsets over time, and the parameters of those curves (e.g., the order of the spline, and the number and location of the spline's control points) are chosen so that the storage needed to store the parameters is minimized through well-known curve-fitting algorithms. In certain embodiments, the number of control points is minimized by eliminating every control point whose removal does not cause the curve to deviate from the fitted offsets beyond a specified acceptable threshold. In certain embodiments, the elimination of a spline control point is coupled with moving adjacent spline control points towards the position of the eliminated point, to minimize the impact of the elimination to the shape of the spline curve.

In one embodiment, each vertex of a character model can map to a texture location using standard UV texture lookup techniques. This improves the spatial coherence of the data (and thus compressibility), but at the expense of wasted texture memory storage space for pixels that don't map to vertices. In another embodiment, a one-to-one correlation between each vertex of a model and each pixel of a video stream can be made through an indexing scheme. In certain instances, the quality and compressibility of this scheme may be dependent upon the indexing. To ensure better spatial coherence of the data, clustering and sorting may be performed used statistical analysis. In one embodiment, the data may be clustered using K-means. Then, PCA can be applied to each cluster, and the vertices can be sorted within a cluster by projecting the temporal sequence onto its largest eigenvector.

Figure 3:
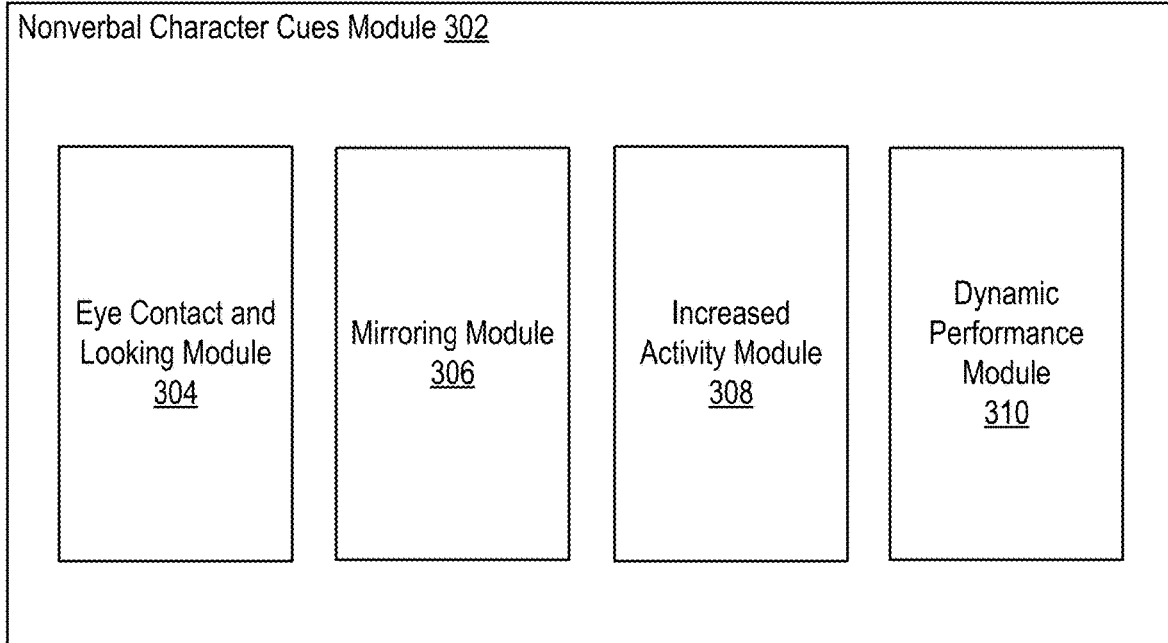
FIG. 3 illustrates an example nonverbal character cues module, according to an embodiment of the present disclosure.

FIG. 3 illustrates an example nonverbal character cues module 302 according to an embodiment of the present disclosure. In some embodiments, the nonverbal character cues module 124 of FIG. 1A can be implemented as the nonverbal character cues module 302. As discussed above, the nonverbal character cues module 302 can be configured to generate nonverbal communication animation data for effectuating one or more nonverbal communication animations in a virtual character. The nonverbal character cues module 302 can generate nonverbal communication animation data based on one or more user inputs and/or VR environment state information. As shown in the example of FIG. 3, the nonverbal character cues module 302 can include an eye contact and looking module 304, a mirroring module 306, an increased activity module 308, and a dynamic performance module 310.

The eye contact and looking module 304 can be configured to generate looking animation data based on user inputs and/or VR environment state information. The looking animation data can be used (e.g., by the simplified character rig animation module 126), to cause a virtual character to look at a target location. One of the most powerful forms of nonverbal communication is eye contact, where a person looks at someone else and makes direct eye contact. This builds a sense of engagement and connection between two people. However, prolonged eye contact can sometimes lead to discomfort. In contrast, avoiding eye contact can have the opposite effect, signaling disinterest, lack of engagement, or even avoidance.

VR provides the audience with complete agency in a scene. They can look anywhere and therefore may miss important parts of the story. VR content creators may find it desirable to direct the eyes of a viewer to the right place at the right time. When a virtual character procedurally adjusts his or her eye direction to directly look at and follow a user, the user naturally responds by focusing his or her attention fully back at the character. The virtual character can maintain eye contact, suspend eye contact temporarily at regular intervals to prevent discomfort but without altogether disengaging the user, or break eye contact (for example to look up at the sky) and lead the user (who is already looking at her) to focus on the next story beat. In an embodiment, the eye contact and looking module 304 can be configured to generate looking animation data that causes a character to look at a user. When it is determined that the user is looking back at the character, the eye contact and looking module 304 can be configured to generate a second set of looking animation data that maintains eye contact, suspends eye contact, or causes the character to look at another object in order to direct the user to look at the other object.

In an embodiment, the eye contact and looking module 304 can be configured to adjust the eye(s), head(s), neck(s), and/or body configuration and location of a virtual character (e.g., adjust associated vertices and/or joints of the character rig/model) so that a character can look directly at a target location such as the viewer's head or hand locations or other objects. The eye contact and looking module 304 can be configured to blend between any number of target locations over time to dynamically adjust a character's eye contact.

The eye contact and looking module 304 can be configured to use the HMD head location of a user as an input in order to set the user's head as the eye contact target for the virtual character. In an embodiment, the eye contact and looking module 304 can be configured to use both the HMD head location and one or more hand controller locations as inputs so that the virtual character can procedurally switch eye contact between the user's head and the user's hands over time. In an embodiment, a set of features on the user's body and face are tracked using computer vision and motion capture techniques. The eye contact and looking module 304 can be configured to track any user feature that is tracked. In another embodiment, the user's eye direction is tracked independently from the head location and orientation. For example, a user may be facing in one direction and looking in another direction. The eye contact and looking module 304 can be configured to track the user's eye direction independently from the head position and orientation. In an embodiment, the eye contact and looking module 304 can be configured to use both the HMD head and hand controller locations of the user as well as the locations of other characters (e.g., the heads of other characters) as inputs. This enables the virtual character to change eye contact between the viewer and other characters in the scene. In another embodiment, the system uses multiple HMD head and hand controller locations associated with multiple users to enable eye contact by a virtual character between multiple users in a shared experience.

The eye contact and looking module 304 can be configured to adjust an animation rig for a virtual character based on a target location. The simplest adjustment is to procedurally modify the eye joint location of the character based on the target location. However, this solution may limit the range of eye contact that can be achieved, the realism of the movement, or the emotion conveyed by the character (e.g., extreme eye movements without any head or neck movement may suggest the character has been immobilized or feels suspicion). In another embodiment, the eye contact and looking module 304 can procedurally modify a series of additional joints (e.g., one or more joints in the body, neck, and head of the character) along with the eye joint location based on how far the eyes need to rotate in order to look at the target location. The eye contact and looking module 304 can also be configured to procedurally modify target locations so that a character can look at different objects over time.

In one example embodiment, the animation joints can be blended or locked directly to the target location. This approach may, in certain instances, be limited in that it removes any source animation present in these animation joints and can remove important acting cues. In another embodiment, the various neck, head, and eye joints can be animated relative to a look at camera in the animation content creation tool. In the real-time processing engine, the eye contact and looking module 304 can transform the look at camera to the target location and then blend each neck, head, and eye joint between the default look at camera and the target look at camera. This approach enables the character to look at specific target locations but retain the original animated performance which is layered relative to the look at. This approach can also be implemented in other interactive animations, such as mirroring and increased activity, as will be described in greater detail herein.

In one embodiment, the eye contact and looking module 304 can be configured to blend between a set (e.g., a plurality) of looking animations that modify the animation rig. This allows artists to fine tune exactly how the character adjusts based on a target location. It also enables animators to inject personality into the looking behavior. In another embodiment, the eye contact and looking module 304 can be configured to blend additional animations to capture nuanced performance such as eye darts.

The mirroring module 306 can be configured to generate mirroring animation data based on user inputs and/or virtual environment state information. The mirroring animation data can be used (e.g., by the simplified character rig animation module 126), to cause a virtual character to mirror the movement and actions of a user while still producing realistic character movement despite any differences in size or appearance between the character and the user. Another powerful nonverbal cue is mimicry or mirroring. Two people will often mirror each other's actions subconsciously without them even realizing it. This human behavior builds connection, and is employed not only in entertainment contexts, but also in clinical or education contexts such as therapy or teaching children. The mirroring module 306 enables virtual characters to mirror actions of a user to build subtle connection with the user.

In one example, the mirroring module 306 can receive HMD position and orientation information as inputs and extract a specific behavior of interest from the head transform, such as a head tilt. The mirroring module 306 can generate mirroring animation data which causes the virtual character to mirror the user's actions on a time delay, for example on a 4 second delay. The mirroring module 306 can generate mirroring animation data which causes the virtual character to mimic the head tilt of the user. In an embodiment, the head tilt transform can be procedurally layered into the animation rig's head joint on a time delay. In another example, the mirroring module 306 can use the HMD location and hand controller locations as inputs to procedurally modify the animation rig's head and hand joints on a time delay. In one embodiment, the input transforms can be used to blend between mirroring animations that then modify the animation rig. For example, a head tilt animation might incorporate facial features such as the character smiling as the head rotates. In one embodiment, the mirroring module 306 can mirror the user's entire body movements based on full body tracking. In another embodiment, the mirroring module 306 can dynamically adjust the time delay before mirroring user actions.

The increased activity module 308 can be configured to generate activity level animation data based on user inputs. The activity level animation data can be used (e.g., by the simplified character rig animation module 126), to cause an adjustment in an activity level of a virtual character. Increased activity levels may indicate positive feelings such as interest and excitement, negative ones such as nervousness, stress, and fear, or be an autonomic response to environmental factors such as low temperature. In children this excitement level is quite apparent. Even excited adults fidget more, talk more, and talk more quickly. Rising activity level can be a subconscious cue that two adults are exploring the possibility of a closer relationship. The increased activity module 308 enables content creators to procedurally layer increased activity based on state information for the VR experience. This behavior can be layered procedurally by speeding up the intensity of an animation or speeding up character speech to adjust the animation rig joints. In another embodiment, the increased activity is achieved by blending specific animations such as fidgeting behavior or nervousness.

The dynamic performance module 310 can be configured to make dynamic adjustments to character performances based on user inputs and/or virtual environment state information. For example, the dynamic performance module 310 can be configured to adjust character staging based on user position information so that the user can always see the performance clearly. As another example, a user can trigger layered character responses such as making a character appear to feel cold. In this example, the dynamic performance module 310 can cause a shivering animation to be layered on top of a character's existing action.

In additional examples, the dynamic performance module 310 can be configured to enable characters to adjust their facial performances as needed, such as adding winks, eye blinks, and/or raising their eyebrows at a user. Procedural nonverbal adjustments can be made at specific points in a narrative or based on user response, such as user gaze or user touch.

The dynamic performance module 310 can support adjusting and/or swapping props that a character manipulates or uses during a performance. The dynamic performance module 310 can swap a prop for a piece of content based on external information about the user. This can be used to dynamically adjust or change props for product placement in a piece of content. Dynamic props can also personalize a piece of content based on prior knowledge about a user. Props can include, for example, clothing, and other elements of the character's appearance such as hair or skin color.

Figure 4:
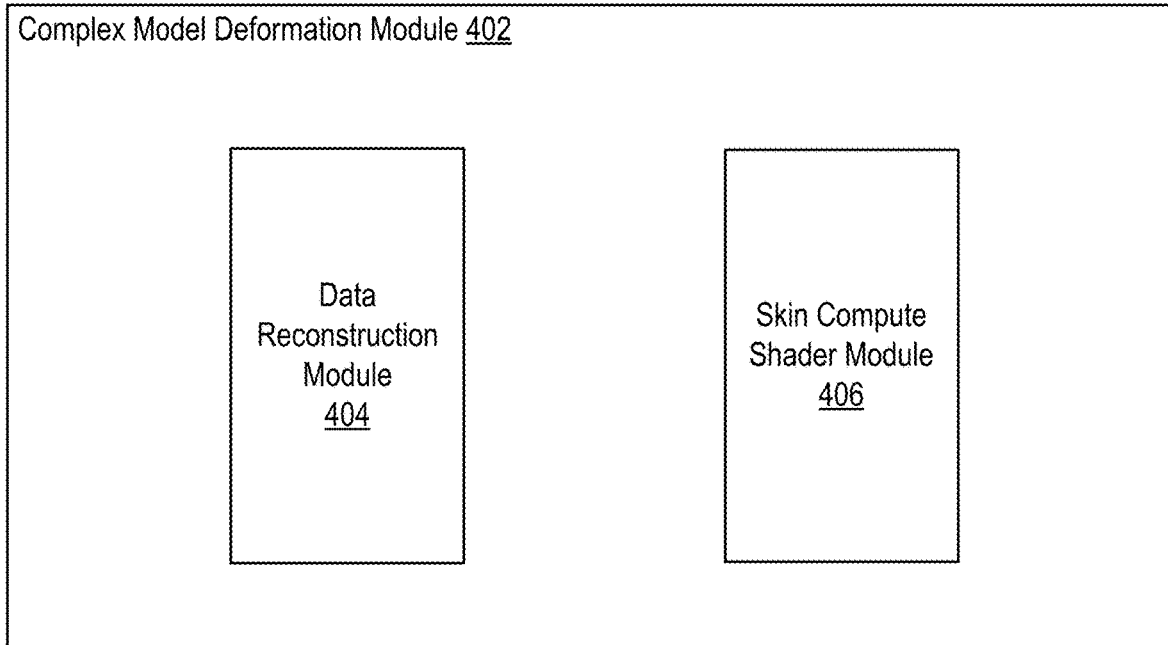
FIG. 4 illustrates an example complex model deformation module, according to an embodiment of the present disclosure.

FIG. 4 illustrates an example complex model deformation module 402 according to an embodiment of the present disclosure. In some embodiments, the complex model deformation module 128 of FIG. 1A can be implemented as the complex model deformation module 402. As shown in the example of FIG. 4, the complex model deformation module 402 can include a data reconstruction module 404 and a skin compute shader module 406.

The data reconstruction module 404 can be configured to, at runtime, decompress any necessary character animation data (e.g., vertex animation data), blend stored offsets using weights calculated during animation of the simplified character rig (e.g., by the animation module 110), and apply skinning transformations. This may be done, for example, using compute shaders, making it highly performant. If statistical methods, such as PCA, have been applied to the character animation data, then the data reconstruction module 404 can be configured to reconstruct the full set of vertices from the lower dimensional data space.

The skin compute shader module 406 can be configured to reconstruct full-quality character (i.e., complex character) deformations based on simplified character deformations for a given vertex as follows:

$$v'' = \left(v + \sum_n x_n(o_n)\right) S$$

where v" is the reconstructed world-space position of the vertex from the full-quality, complex character rig, S is the combined transform produced by the simplified character rig, v is the reference position of the model, x is the weight of the given animation clip, and o is the offset of the vertex at the given frame of the animation clip. The result is a reconstruction of the data provided by the data exporter module 202 but with procedural animation applied from the simplified character rig animation module 126. This reconstruction is perfect if no compression was used by the data exporter module 202, or if lossless compression was used; otherwise, if lossy compression was used, the reconstruction is a close approximation.

Figure 5:
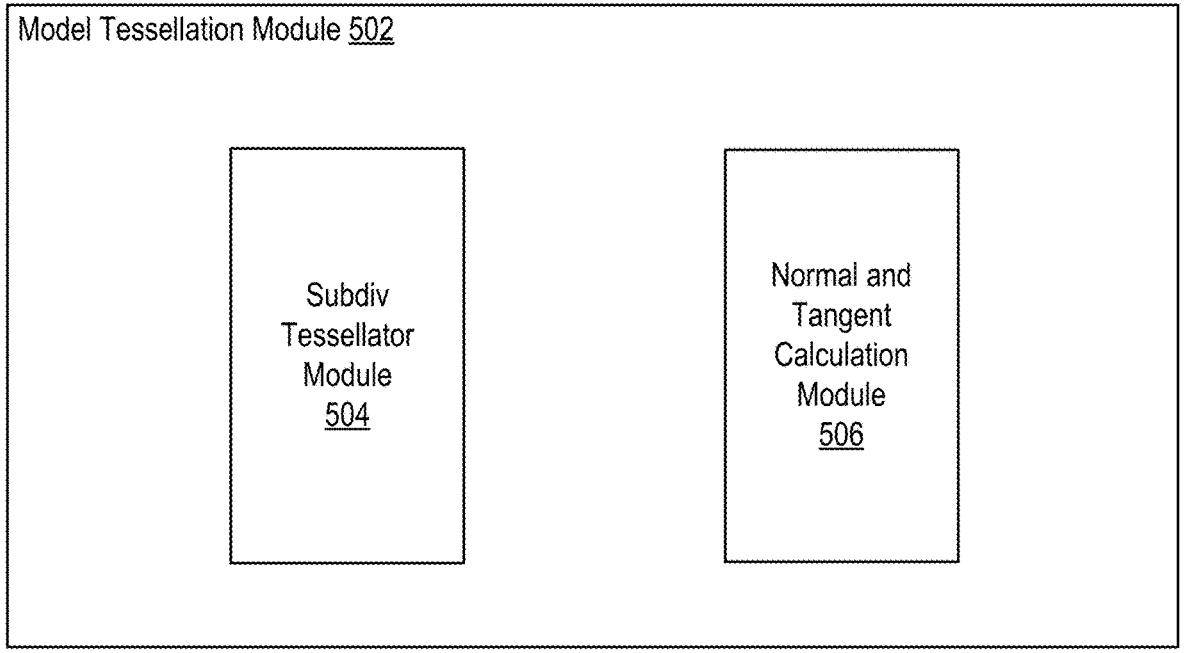
FIG. 5 illustrates an example model tessellation module, according to an embodiment of the present disclosure.

FIG. 5 illustrates an example model tessellation module 502 according to an embodiment of the present disclosure. In some embodiments, the model tessellation module 130 of FIG. 1A can be implemented as the model tessellation module 502. As shown in the example of FIG. 5, the model tessellation module 502 can include a subdiv tessellator module 504 and a normal and tangent calculation module 506.

The subdiv tessellator module 504 can be configured to smooth and refine character animation geometry to generate a refined mesh. In one embodiment, the subdiv tessellator module 504 can smooth character animation geometry using Catmull-Clark subdivision surfaces. Stencil weights can be precomputed for all subdivided vertex positions, making the real-time calculation a simple linear combination of the hull vertex positions. In an embodiment, the subdiv tessellator module 504 can be configured to smooth and refine character animation geometry using a recursive refinement technique that produces progressively smoother versions of a mesh. In each iteration:

Each face of the mesh produces an additional vertex (F) at its centroid;

Each edge of the mesh produces an additional vertex (E) as a weighted combination of its centroid and the centroids of the incident faces (F); and Each vertex (V) of the mesh is placed at a weighted combination of its original position, the centroids of incident edges (E), and the centroids of incident faces (F).

Figure 6:
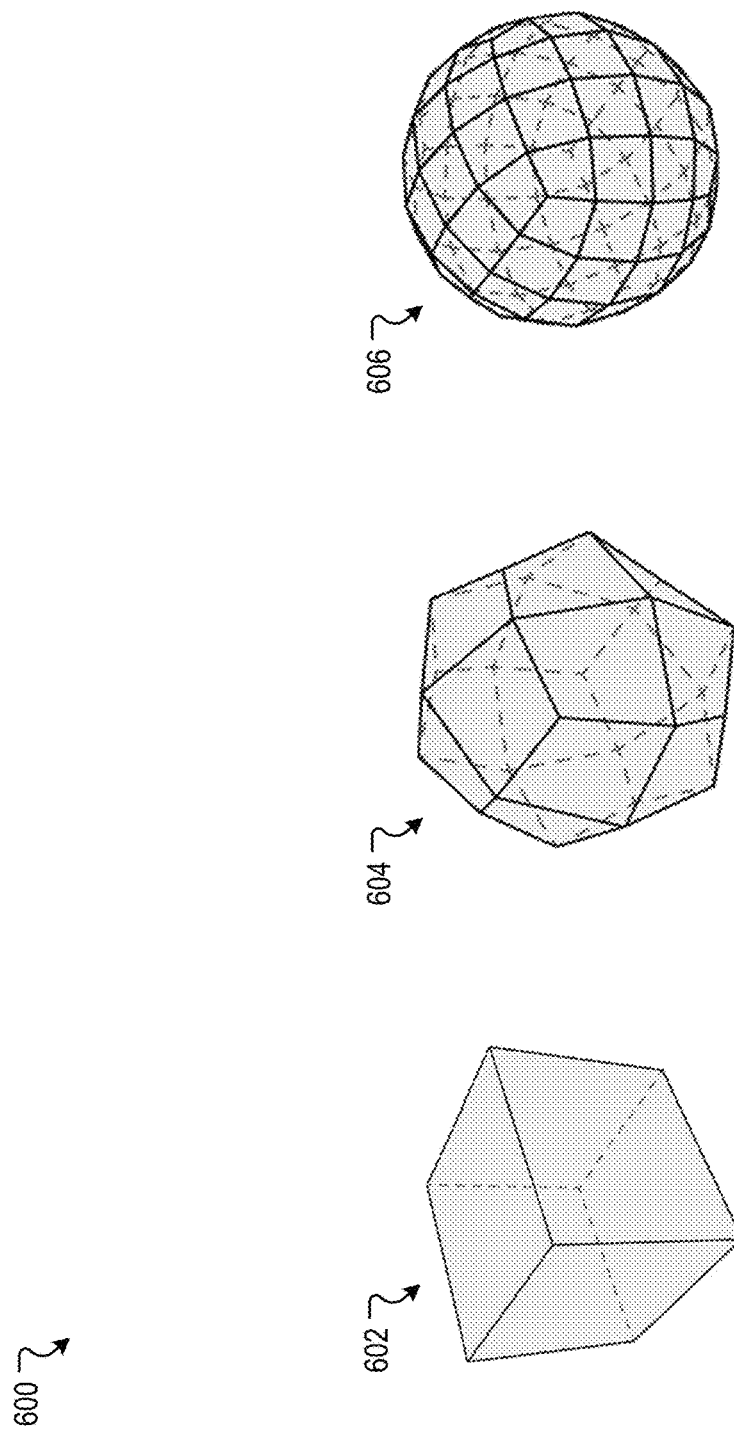
FIG. 6 illustrates an example scenario associated with model tessellation, according to an embodiment of the present disclosure.

FIG. 6 illustrates an example scenario 600 depicting two sample iterations of the recursive technique described above. An initial (or base) mesh 602 is refined in a first iteration to generate a first refined mesh 604, which is further refined in a second iteration to generate a second refined mesh 606. It can be seen that each iteration results in a greater number of vertices, faces, and edges, resulting in a progressively more refined mesh. The dependency of (V) on (F) and (E), and of (E) on (F), can be simplified by back-substitution. By applying this substitution, any vertex in any subdivision level of a refined mesh can be represented as a linear weighted combination of the vertices in the deformed base mesh. The weights used in the linear combination depend only on the base mesh topology, which remains constant at runtime. As such, the weights can be computed once as a pipeline step and stored. Although the number of weights used to represent a particular vertex in a refined mesh may be limited only by the number of vertices in the base mesh, in certain embodiments, the number may be tied to the valence of the vertex and the number of vertices in each incident face. In certain embodiments, a hard limit may be set. For example, each vertex in a refined mesh may be represented by no more than 10 weights. In certain embodiments, the retained weights may be the ones with the largest absolute magnitudes. For example, each vertex may be represented by the 10 largest weights.

Returning to FIG. 5, the normal and tangent calculation module 506 can be configured to calculate approximate normal and tangent vectors for each vertex in a mesh (e.g., a refined mesh or a base mesh) by using an analog of the dual-graph of the mesh. This approach produces high-quality normals and tangents, even on arbitrarily deformed geometry.

In a piecewise mesh with ordered vertices around each face, geometric normals are implicitly defined on the mesh faces. However, to give the appearance of a smooth mesh, each vertex can be assigned a normal as some linear combination of the normals of the incident faces, and then these vertex normals can be linearly interpolated across a polygon using barycentric weights. However, this technique is computationally expensive since it requires the precomputation of the face normals of all incident faces to a given vertex. As a result, real-time game engines rarely calculate vertex normals from the deformed vertex positions. Instead, they are typically calculated once in the reference pose, and then deformed using the skinning weights and transforms.

Figure 7:
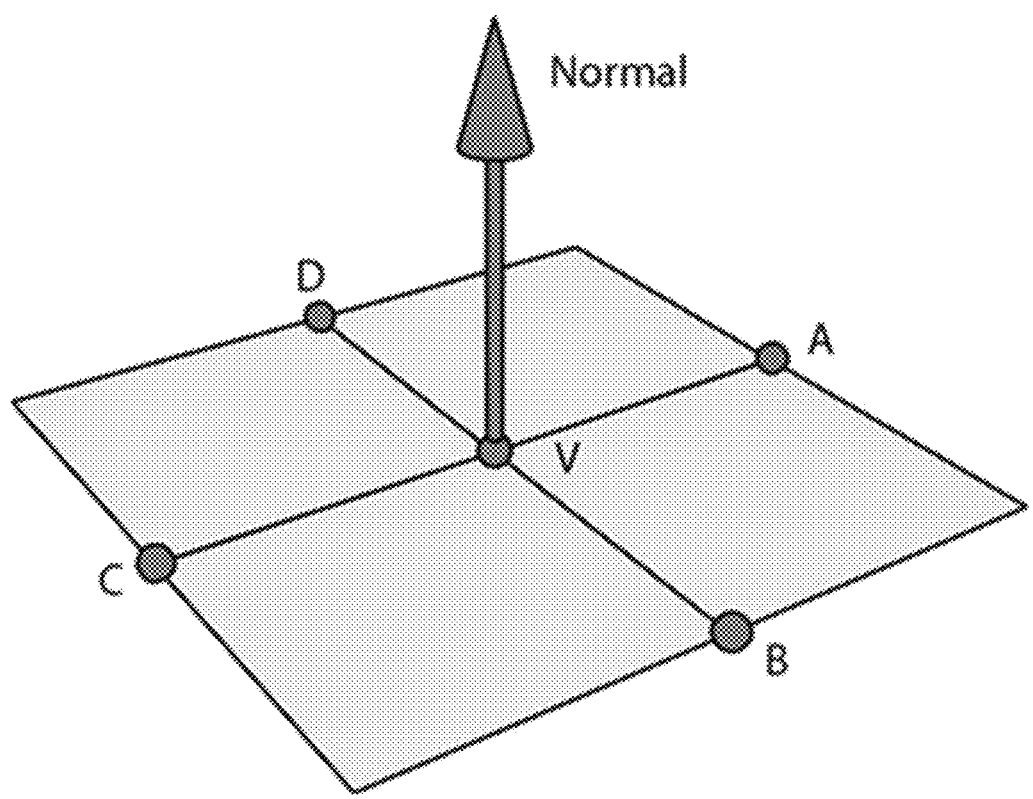
FIG. 7 illustrates an example scenario associated with approximation of normal vectors, according to an embodiment of the present disclosure.

In an embodiment, the normal and tangent calculation module 506 can be configured to approximate vertex normals using four evenly-spaced adjacent vertices. For quad-dominant meshes, such as those typically used with Catmull-Clark subdivisions, most vertices have exactly four neighbors, making the choice of the four adjacent vertices A, B, C, and D simple and unambiguous. FIG. 7 illustrates an example scenario 700 in which a vertex V has exactly four neighbors, A, B, C, and D. In such scenarios, the normal can be calculated as follows:

$$\text{Normal} = \frac{(A-C) \times (B-D)}{\|(A-C) \times (B-D)\|}$$

Figure 8:
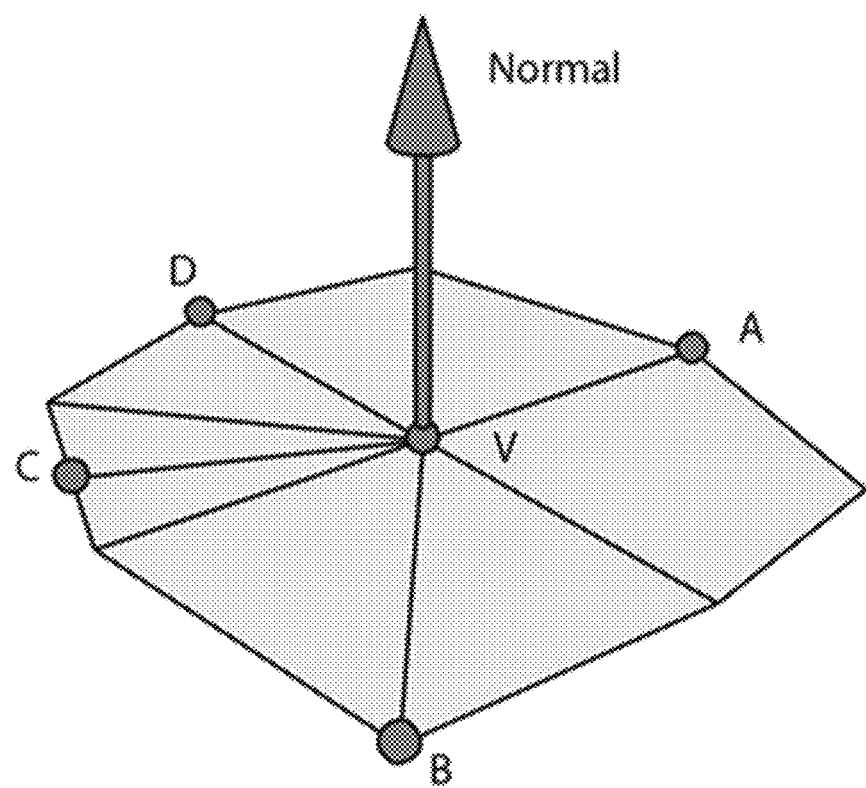
FIG. 8 illustrates an example scenario associated with approximation of normal vectors, according to an embodiment of the present disclosure.

For extraordinary vertices with more than four adjacent vertices, the normal and tangent calculation module 506 can be configured to select four evenly-spaced adjacent vertices from a set of adjacent vertices. In one embodiment, the four adjacent vertices may be chosen using only topological considerations. For example, if a vertex has eight incident edges, every other adjacent vertex could be used. In one embodiment, the four adjacent vertices may be chosen using intrinsic properties of the mesh. For example, the four adjacent vertices can be chosen such that the angle formed at the vertex by the two edges connecting the vertex to any two chosen sequential adjacent vertices is as close to 90 degrees as possible. FIG. 8 illustrates an example scenario 800 in which a vertex V has more than four adjacent vertices. In the example scenario 800, the vertex V has eight adjacent vertices, and the four adjacent vertices A, B, C, and D have been selected by selecting every other adjacent vertex.

Figure 9:
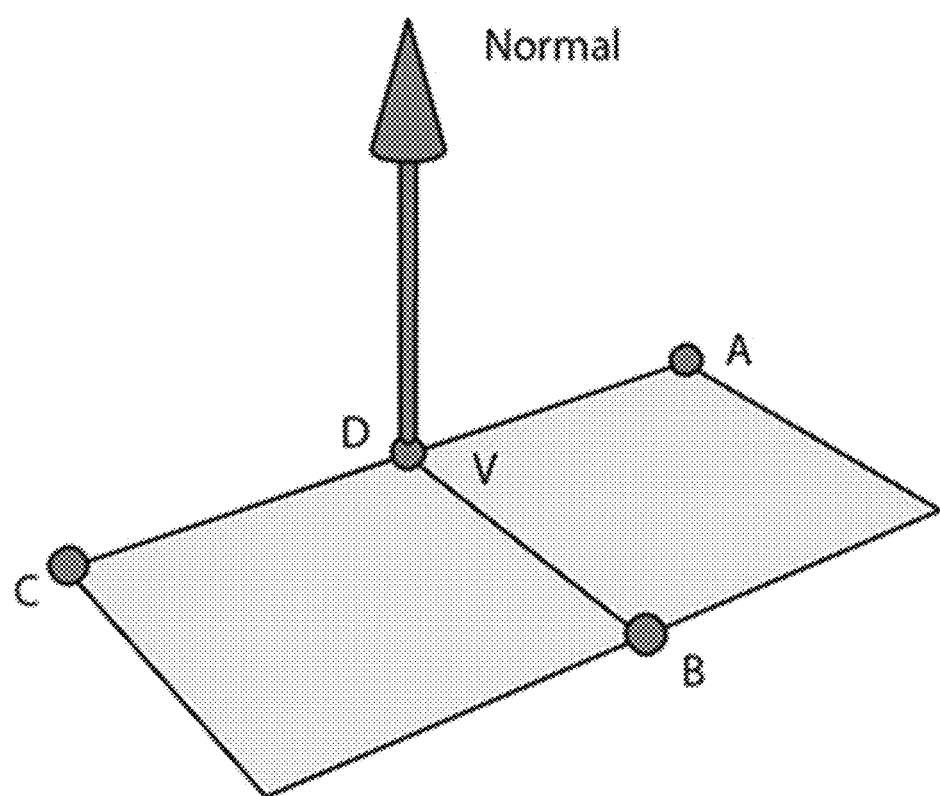
FIG. 9 illustrates an example scenario associated with approximation of normal vectors, according to an embodiment of the present disclosure.

For border vertices in which a vertex has fewer than four adjacent vertices, the normal and tangent calculation module 506 can be configured to substitute the vertex itself in place of any missing vertices. FIG. 9 illustrates an example scenario 900 in which a vertex V has fewer than four adjacent vertices. In the example scenario 900, the vertex V has only three adjacent vertices, A, B, and C. As such, the vertex V, itself, is substituted as the fourth adjacent vertex, D.

In an embodiment, tangent vectors may follow a similar construction. Although an infinite number of tangent vectors exist for a given vertex (any vector that is perpendicular to the defined normal), in one embodiment, the normal and tangent calculation module 506 can be configured to select the tangent vector that aligns with the U direction of a UV parameterization of the mesh. Conveniently, in the disclosed representation, this tangent vector is a linear combination of the basis vectors (A-C) and (B-D). The coefficients depend only on the topology and the UV parameterization, which remain fixed at run-time, allowing the weights of the linear combination to be precomputed as a pipeline step. In an embodiment, the tangent vector can be calculated as follows:

$$\text{Tangent} = \frac{(A_V - C_V)(A-C) + (D_V - B_V)(B-D)}{\|(A_V - C_V)(A-C) + (D_V - B_V)(B-D)\|}$$

$A_V$, $B_V$, $C_V$, $D_V$ represent the V component of the UV parametrization of the mesh at vertices A, B, C, and D.

Vertex positions for a refined mesh, as determined by the subdiv tessellator module 504, and approximate normal and tangent vectors for each vertex in the refined mesh, as calculated by the normal and tangent calculation module 506, are passed to vertex shaders where they can be consumed by the render pipeline module 132 of FIG. 1A.

Figure 10:
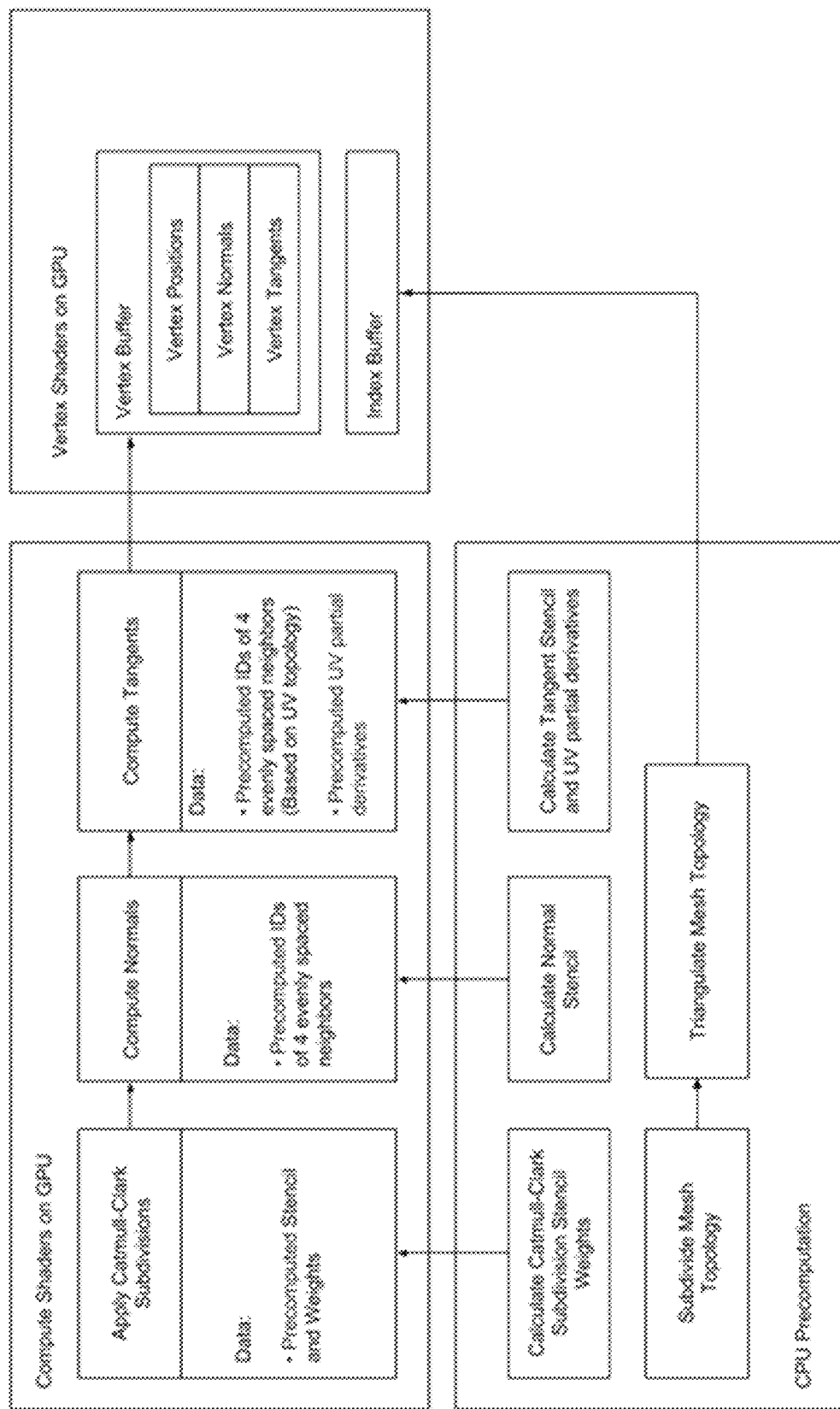
FIG. 10 illustrates an example flow block diagram for the generation of subdivision surfaces, according to an embodiment of the present disclosure.

FIG. 10 details an exemplary process for generating the vertex positions, normal, and tangents for a Catmull-Clark subdivision surface based on a polygonal control model. This pipeline is optimized for real-time computation on a GPU.

Figure 11:
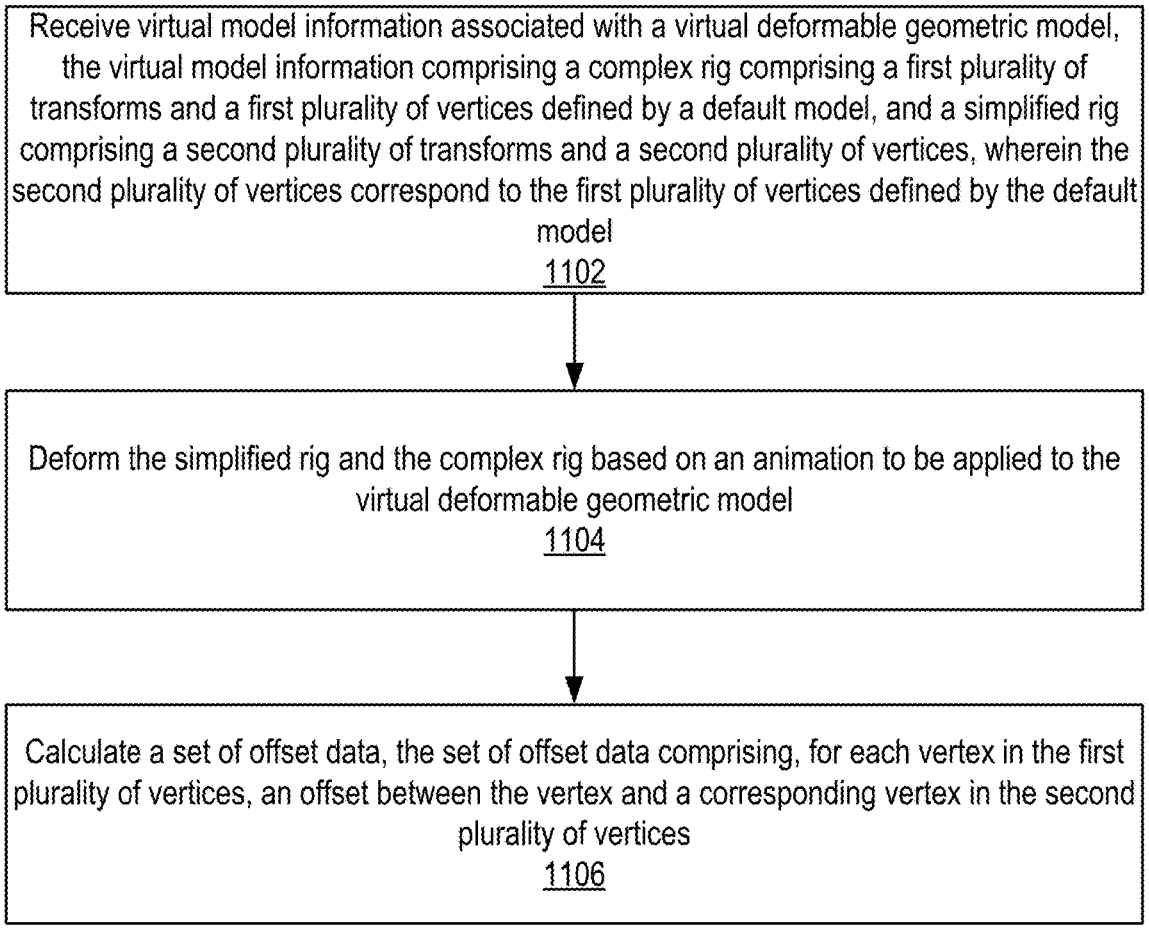
FIG. 11 illustrates an example method to calculate vertex offset data between the vertices of a complex and a simple character model, according to an embodiment of the present disclosure.

FIG. 11 illustrates an example method 1100, according to an embodiment of the present technology. At block 1102, the method 1100 can receive virtual model information associated with a virtual deformable geometric model, the virtual model information comprising a complex rig comprising a first plurality of transforms and a first plurality of vertices defined by a default model, and a simplified rig comprising a second plurality of transforms and a second plurality of vertices, wherein the second plurality of vertices correspond to the first plurality of vertices defined by the default model. At block 1104, the method 1100 can deform the simplified rig and the complex rig based on an animation to be applied to the virtual deformable geometric model. At block 1106, the method 1100 can calculate a set of offset data, the set of offset data comprising, for each vertex in the first plurality of vertices, an offset between the vertex and a corresponding vertex in the second plurality of vertices.

FIG. 12 illustrates an example method 1200, according to an embodiment of the present technology. At block 1202, the method 1200 can receive virtual model information associated with a virtual deformable geometric model, the virtual model information comprising a complex rig comprising a first plurality of transforms and a first plurality of vertices defined by a default model, and a simplified rig comprising a second plurality of transforms and a second plurality of vertices, wherein the second plurality of vertices correspond to the first plurality of vertices defined by the default model. At block 1204, the method 1200 can deform the simplified rig and the complex rig based on an animation to be applied to the virtual deformable geometric model. At block 1206, the method 1200 can calculate a set of offset data, the set of offset data comprising, for each vertex in the first plurality of vertices, an offset between the vertex and a corresponding vertex in the second plurality of vertices. At block 1208, the method 1200 can export a compressed version of the set of offset data to a real-time processing engine for real-time animation of the virtual deformable geometric model.

FIG. 13 illustrates an example method 1300, according to an embodiment of the present technology. At block 1302, the method 1300 can identify a virtual deformable geometric model to be animated in a real-time immersive environment, the virtual deformable geometric model comprising a virtual model mesh comprising a plurality of vertices, a plurality of edges, and a plurality of faces. At block 1304, the method 1300 can iteratively refine the virtual model mesh in one or more iterations to generate a refined mesh, wherein each iteration of the one or more iterations increases the number of vertices, the number of edges, and/or the number of faces. At block 1306, the method 1300 can present the refined mesh during real-time animation of the virtual deformable geometric model within the real-time immersive environment.

Figure 14:
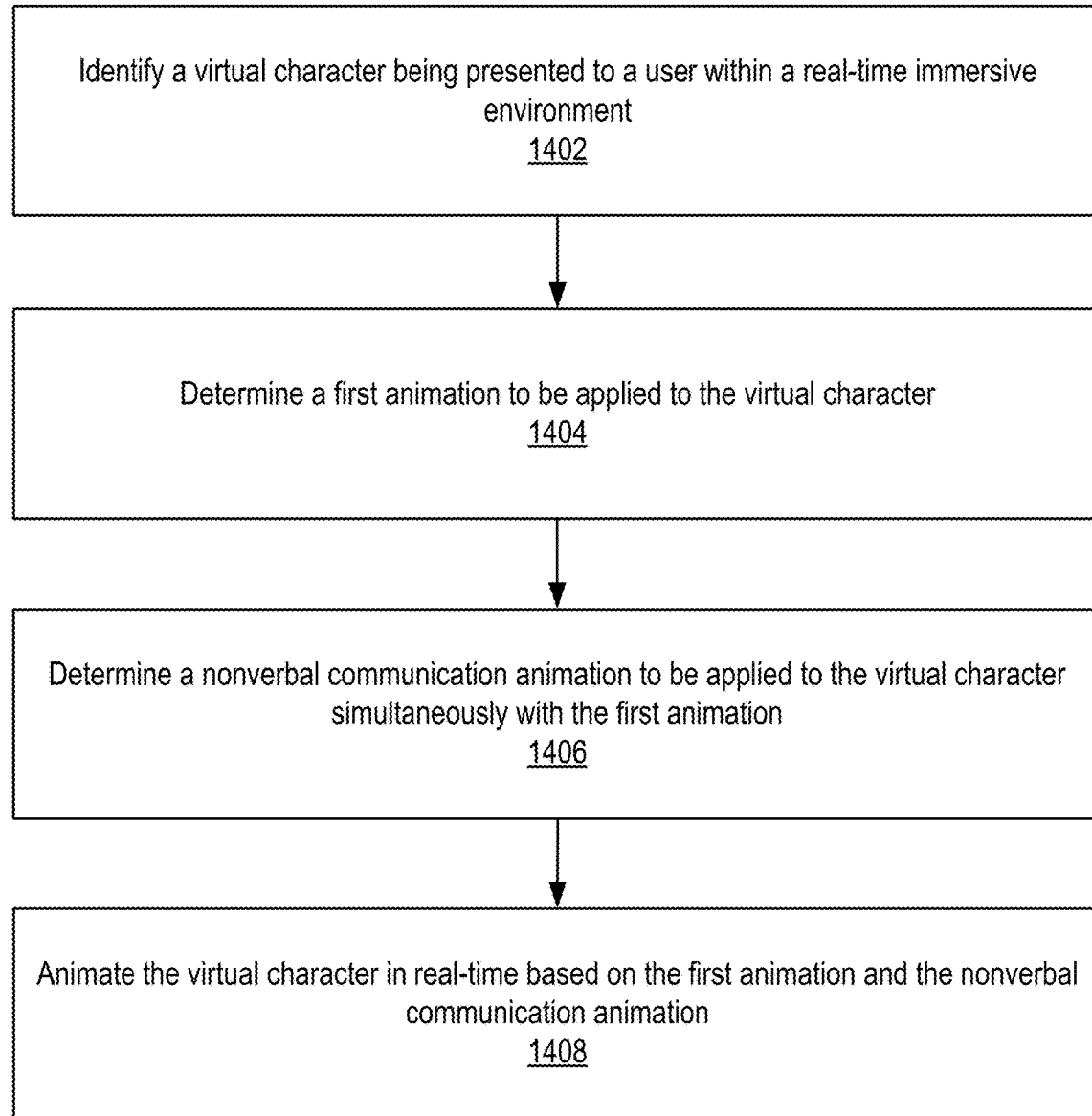
FIG. 14 illustrates an example method to augment virtual character animation with nonverbal communication animation, according to an embodiment of the present disclosure.

FIG. 14 illustrates an example method 1400, according to an embodiment of the present technology. At block 1402, the method 1400 can identify a virtual character being presented to a user within a real-time immersive environment. At block 1404, the method 1400 can determine a first animation to be applied to the virtual character. At block 1406, the method 1400 can determine a nonverbal communication animation to be applied to the virtual character simultaneously with the first animation. At block 1408, the method 1400 can animate the virtual character in real-time based on the first animation and the nonverbal communication animation.

Many variations to the example methods are possible. It should be appreciated that there can be additional, fewer, or alternative steps performed in similar or alternative orders, or in parallel, within the scope of the various embodiments discussed herein unless otherwise stated.

Hardware Implementation

Figure 15:
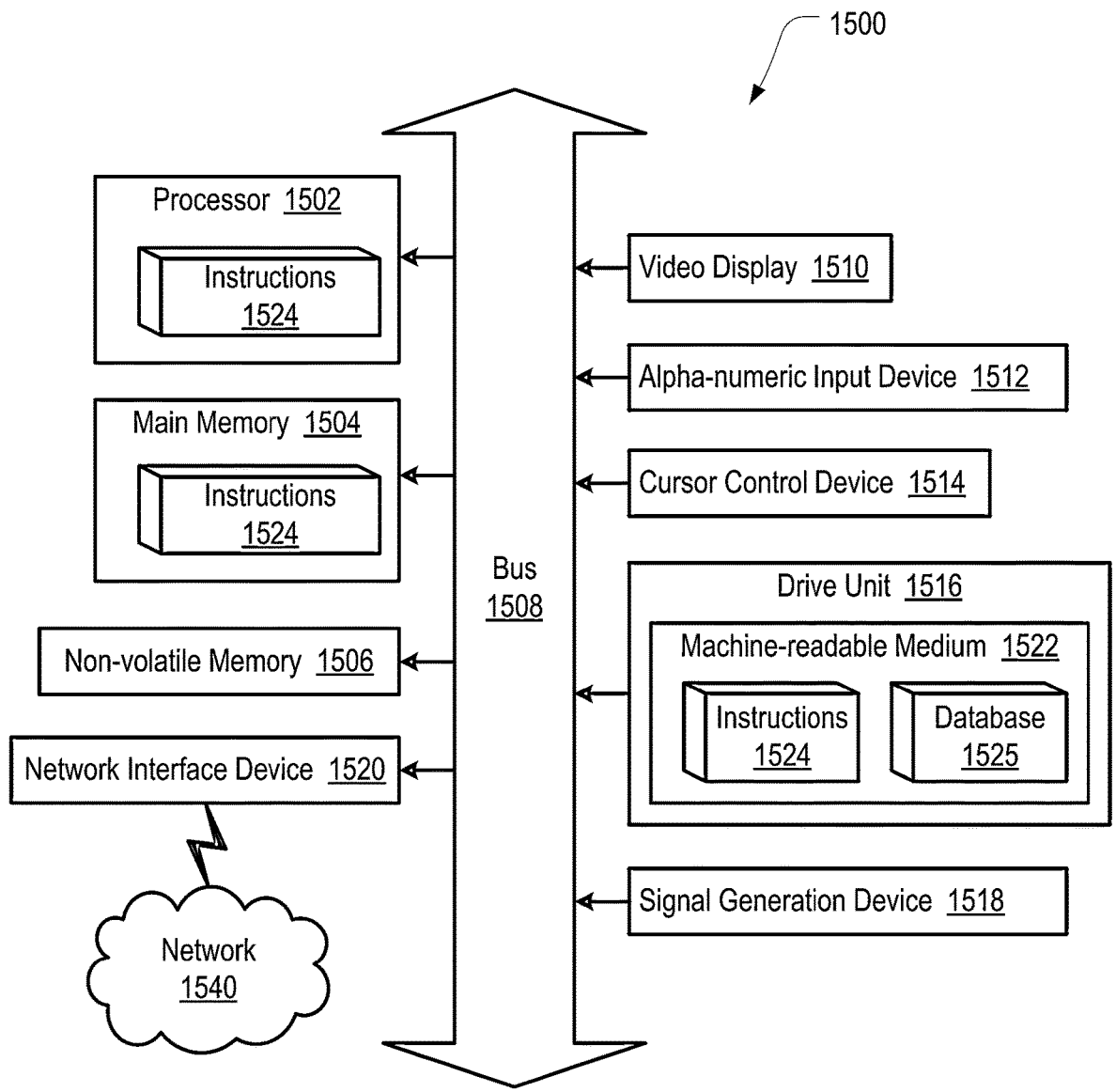
FIG. 15 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 15 illustrates an example machine 1500 within which a set of instructions for causing the machine to perform one or more of the embodiments described herein can be executed, in accordance with an embodiment of the present disclosure. The embodiments can relate to one or more systems, methods, or computer readable media. The machine may be connected (e.g., networked) to other machines. In a networked deployment, the machine may operate in the capacity of a server or a client machine in a client-server network environment, or as a peer machine in a peer-to-peer (or distributed) network environment.

The computer system 1500 includes a processor 1502 (e.g., a central processing unit (CPU), a graphics processing unit (GPU), or both), a main memory 1504, and a nonvolatile memory 1506 (e.g., volatile RAM and non-volatile RAM, respectively), which communicate with each other via a bus 1508. The processor 1502 can be implemented in any suitable form, such as a parallel processing system. In some cases, the example machine 1500 can correspond to, include, or be included within a computing device or system. For example, in some embodiments, the machine 1500 can be a desktop computer, a laptop computer, personal digital assistant (PDA), an appliance, a wearable device, a camera, a tablet, or a mobile phone, etc. In one embodiment, the computer system 1500 also includes a video display 1510, an alphanumeric input device 1512 (e.g., a keyboard), a cursor control device 1514 (e.g., a mouse), a drive unit 1516, a signal generation device 1518 (e.g., a speaker) and a network interface device 1520.

In one embodiment, the video display 1510 includes a touch sensitive screen for user input. In one embodiment, the touch sensitive screen is used instead of a keyboard and mouse. The disk drive unit 1516 includes a machine-readable medium 1522 on which is stored one or more sets of instructions 1524 (e.g., software) embodying any one or more of the methodologies or functions described herein. The instructions 1524 can also reside, completely or at least partially, within the main memory 1504 and/or within the processor 1502 during execution thereof by the computer system 1500. The instructions 1524 can further be transmitted or received over a network 1540 via the network interface device 1520. In some embodiments, the machine-readable medium 1522 also includes a database 1525.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory 1506 may also be a random access memory. The non-volatile memory 1506 can be a local device coupled directly to the rest of the components in the computer system 1500. A non-volatile memory that is remote from the system, such as a network storage device coupled to any of the computer systems described herein through a network interface such as a modem or Ethernet interface, can also be used.

While the machine-readable medium 1522 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals. The term "storage module" as used herein may be implemented using a machine-readable medium.

In general, routines executed to implement the embodiments of the invention can be implemented as part of an operating system or a specific application, component, program, object, module or sequence of instructions referred to as "programs" or "applications". For example, one or more programs or applications can be used to execute any or all of the functionality, techniques, and processes described herein. The programs or applications typically comprise one or more instructions set at various times in various memory and storage devices in the machine and that, when read and executed by one or more processors, cause the computing system 1500 to perform operations to execute elements involving the various aspects of the embodiments described herein.

The executable routines and data may be stored in various places, including, for example, ROM, volatile RAM, non-volatile memory, and/or cache memory. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of computing systems, those skilled in the art will appreciate that the various embodiments are capable of being distributed as a program product in a variety of forms, and that the embodiments described herein apply equally regardless of the particular type of machine- or computer-readable media used to actually effect the distribution. Examples of machine-readable media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment", "an embodiment", "other embodiments", "another embodiment", "in various embodiments," or the like means that a particular feature, design, structure, or characteristic described in connection with the embodiment is included in at least one embodiment of the disclosure. The appearances of, for example, the phrases "according to an embodiment", "in one embodiment", "in an embodiment", "in various embodiments," or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

It should also be understood that a variety of changes may be made without departing from the essence of the invention. Such changes are also implicitly included in the description. They still fall within the scope of this invention. It should be understood that this disclosure is intended to yield a patent covering numerous aspects of the invention, both independently and as an overall system, and in both method and apparatus modes.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
receiving, by a computing system, virtual model information associated with a virtual deformable geometric model, the virtual model information comprising
a complex rig comprising a first plurality of transforms and a first plurality of vertices defined by a default model, and
a simplified rig comprising a second plurality of transforms and a second plurality of vertices, wherein the second plurality of vertices correspond to the first plurality of vertices defined by the default model;

deforming, by the computing system, the simplified rig and the complex rig based on an animation to be applied to the virtual deformable geometric model;

calculating, by the computing system, a set of offset data, the set of offset data comprising, for a vertex in the first plurality of vertices, an offset between the vertex and a corresponding vertex in the second plurality of vertices, wherein the first plurality of vertices and the second plurality of vertices are associated with a complex character mesh, and offsets between vertices in the first plurality of vertices and corresponding vertices in the second plurality of vertices are associated with levels of quantization;

generating, by the computing system, a compressed version of the set of offset data, wherein the generating the compressed version of the set of offset data comprises calculating a tight bounding box for a vertex of the first plurality of vertices; and providing, by the computing system, the compressed version of the set of offset data to a real-time processing engine for real-time animation of the virtual deformable geometric model.

2. The computer-implemented method of claim 1, wherein the generating the compressed version of the set of offset data further comprises quantizing offsets in the set of offset data based on tight bounding boxes to generate a lower bit quantization of offset data.

3. The computer-implemented method of claim 2, wherein the generating the compressed version of the set of offset data further comprises combining the lower bit quantization of offset data with a video compression technique by mapping X, Y, and Z offset values to color component values.

4. The computer-implemented method of claim 2, wherein the generating the compressed version of the set of offset data further comprises combining the lower bit quantization of offset data with lossy or lossless audio compression techniques by mapping the X, Y, and Z offset values to channels of an audio stream.

5. The computer-implemented method of claim 2, wherein the generating the compressed version of the set of offset data further comprises combining the lower bit quantization of offset data with lossy or lossless photo compression techniques by mapping the X, Y, and Z offset values to the color component values of pixels in a photo and using adjacent pixels for sequential animation frames.

6. The computer-implemented method of claim 1, wherein the levels of quantization are associated with numbers of bits, including a first level of quantization associated with a first number of bits and a second level of quantization associated with a second number of bits.

7. The computer-implemented method of claim 6, wherein the first level of quantization is associated with a first vertex.

8. The computer-implemented method of claim 1, wherein the level of quantization is associated with a frame of the animation.

9. The computer-implemented method of claim 1, wherein a plurality of tight bounding boxes are calculated for each vertex of the first plurality of vertices based on the levels of quantization.

10. The computer-implemented method of claim 1, wherein the generating the compressed version of the set of offset data further comprises correlating each vertex of the first plurality of vertices to a pixel of a video stream.

11. The computer-implemented method of claim 10, wherein the correlating each vertex of the first plurality of vertices to a pixel of a video stream comprises correlating each vertex of the first plurality of vertices to a pixel of a video stream by mapping each vertex of the first plurality of vertices to a texture location using a texture lookup or by using an indexing scheme.

12. The computer-implemented method of claim 1, wherein the generating the compressed version of the set of offset data further comprises clustering the set of offset data to generate a plurality of clusters.

13. A system comprising:
at least one processor; and
a memory storing instructions that, when executed by the at least one processor, cause the system to perform operations comprising:

receiving virtual model information associated with a virtual deformable geometric model, the virtual model information comprising a complex rig comprising a first plurality of transforms and a first plurality of vertices defined by a default model, and a simplified rig comprising a second plurality of transforms and a second plurality of vertices, wherein the second plurality of vertices correspond to the first plurality of vertices defined by the default model;

deforming the simplified rig and the complex rig based on an animation to be applied to the virtual deformable geometric model;

calculating a set of offset data, the set of offset data comprising, for a vertex in the first plurality of vertices, an offset between the vertex and a corresponding vertex in the second plurality of vertices, wherein the first plurality of vertices and the second plurality of vertices are associated with a complex character mesh, and offsets between vertices in the first plurality of vertices and corresponding vertices in the second plurality of vertices are associated with levels of quantization;

generating a compressed version of the set of offset data, wherein the generating the compressed version of the set of offset data comprises calculating a tight bounding box for a vertex of the first plurality of vertices; and providing the compressed version of the set of offset data to a real-time processing engine for real-time animation of the virtual deformable geometric model.

14. The system of claim 13, wherein the generating the compressed version of the set of offset data further comprises quantizing offsets in the set of offset data based on tight bounding boxes to generate a lower bit quantization of offset data.

15. The system of claim 13, wherein the levels of quantization are associated with numbers of bits, including a first level of quantization associated with a first number of bits and a second level of quantization associated with a second number of bits.

16. The system of claim 13, wherein the levels of quantization are associated with numbers of bits, including a first level of quantization associated with a first number of bits and a second level of quantization associated with a second number of bits.

17. The system of claim 16, wherein the first level of quantization is associated with a first vertex.

18. A non-transitory computer-readable storage medium including instructions that, when executed by at least one processor of a computing system, cause the computing system to perform operations comprising:

receiving virtual model information associated with a virtual deformable geometric model, the virtual model information comprising
- a complex rig comprising a first plurality of transforms and a first plurality of vertices defined by a default model, and
- a simplified rig comprising a second plurality of transforms and a second plurality of vertices, wherein the second plurality of vertices correspond to the first plurality of vertices defined by the default model;

deforming the simplified rig and the complex rig based on an animation to be applied to the virtual deformable geometric model;

calculating a set of offset data, the set of offset data comprising, for a vertex in the first plurality of vertices, an offset between the vertex and a corresponding vertex in the second plurality of vertices, wherein
- the first plurality of vertices and the second plurality of vertices are associated with a complex character mesh, and
- offsets between vertices in the first plurality of vertices and corresponding vertices in the second plurality of vertices are associated with levels of quantization;

generating a compressed version of the set of offset data, wherein the generating the compressed version of the set of offset data comprises calculating a tight bounding box for a vertex of the first plurality of vertices; and providing the compressed version of the set of offset data to a real-time processing engine for real-time animation of the virtual deformable geometric model.

19. The non-transitory computer-readable storage medium of claim 18, wherein the generating the compressed version of the set of offset data further comprises quantizing offsets in the set of offset data based on tight bounding boxes to generate a lower bit quantization of offset data.

20. The non-transitory computer-readable storage medium of claim 18, wherein the levels of quantization are associated with numbers of bits, including a first level of quantization associated with a first number of bits and a second level of quantization associated with a second number of bits.

* * * * *